US011787821B2

(12) United States Patent
Robinson et al.

(10) Patent No.: US 11,787,821 B2
(45) Date of Patent: Oct. 17, 2023

(54) CATALYST AND PROCESS FOR RING OPENING POLYMERIZATION

(71) Applicant: Brown University, Providence, RI (US)

(72) Inventors: Jerome R. Robinson, Providence, RI (US); Xiang Dong, Providence, RI (US)

(73) Assignee: Brown University, Providence, RI (US)

( * ) Notice: Subject to any disclaimer, the term of this patent is extended or adjusted under 35 U.S.C. 154(b) by 195 days.

(21) Appl. No.: 17/127,219

(22) Filed: Dec. 18, 2020

(65) Prior Publication Data
US 2021/0188878 A1 Jun. 24, 2021

Related U.S. Application Data

(60) Provisional application No. 62/950,702, filed on Dec. 19, 2019.

(51) Int. Cl.
  *C07F 5/00* (2006.01)
  *B01J 31/12* (2006.01)

(52) U.S. Cl.
  CPC .............. *C07F 5/003* (2013.01); *B01J 31/12* (2013.01)

(58) Field of Classification Search
  CPC ...... B01J 31/1805; B01J 31/0202; C01F 1/00; C07F 5/003
  See application file for complete search history.

(56) References Cited

FOREIGN PATENT DOCUMENTS

JP         2008-120733      *   5/2008

OTHER PUBLICATIONS

Deng, Journal of Organometallic Chemistry 749 (2014) 356-363 (Year: 2014).*
Translation of JP 2008-120733 (Year: 2008).*
Abe et al., "Enzymatic and Environmental Degradation of Racemic Poly(3-hydroxybutyric acid)s with Different Stereoregularities", Macromolecules, vol. 29, No. 27, 1996, pp. 8683-8688.
Ajellal , et al., "Bis(guanidinate) Alkoxide Complexes of Lanthanides: Synthesis, Structures and Use in Immortal and Stereoselective Ring-Opening Polymerization of Cyclic Esters", Chemistry—A European Journal, vol. 14, 2008, pp. 5440-5448.
Ajellal et al., "Polymerization of Racemic β-Butyrolactone using Supported Catalysts: A Simple Access to Isotactic Polymers", Chemical Communications, vol. 46, 2010, pp. 1032-1034.
Ajellal et al., "Syndiotactic-Enriched Poly(3-hydroxybutyrate)s via Stereoselective Ring-Opening Polymerization of Racemic β-Butyrolactone with Discrete Yttrium Catalysts", Macromolecules, vol. 42, No. 4, 2009, pp. 987-993.
Alaaeddine et al., "Bis[Bis(Oxazolinato)] Complexes of Yttrium and Lanthanum: Molecular Structure and Use in Polymerization of DL-Lactide and DL-β-Butyrolactone", European Journal of Inorganic Chemistry, vol. 18, 2006, pp. 3652-3658.
Altenbuchner et al., "Mechanistic Investigations of the Stereoselective Rare Earth Metal-Mediated Ring-Opening Polymerization of β-Butyrolactone", Chemistry—A European Journal, vol. 21, 2015, pp. 13609-13617.
Amgoune et al., "Highly Active, Productive, and Syndiospecific Yttrium Initiators for the Polymerization of Racemic β-Butyrolactone", Angewandte Chemie International Edition, vol. 45, 2006, pp. 2782-2784.
Anjum et al., "Microbial Production of Polyhydroxyalkanoates (PHAs) and its Copolymers: A Review of Recent Advancements", International Journal of Biological Macromolecules, vol. 89, 2016, pp. 161-174.
Anwander et al., "Synthesis and Structural Characterisation of Rare-Earth Bis(Dimethylsilyl)Amides and their Surface Organometallic Chemistry on Mesoporous MCM-41", Journal of the Chemical Society, Dalton Transactions, No. 5, 1998, pp. 847-858.
Arcana et al., "Structure and Morphology of Poly(β-Hydroxybutyrate) Synthesized by Ring-Opening Polymerization of Racemic (R,S)-β-Butyrolactone with Distannoxane Derivatives.", Polymer International, vol. 49, 2000, pp. 1348-1355.
Bouyahyi et al., "Exploring Electronic versus Steric Effects in Stereoselective Ring-Opening Polymerization of Lactide and β-Butyrolactone with Amino-alkoxy-bis(phenolate)—Yttrium Complexes", Chemistry—A European Journal, vol. 17, 2011, pp. 1872-1883.
Brulè et al., "Polymerization of Racemic βButyrolactone Using Gold Catalysts: A Simple Access to Biodegradable Polymers", Organometallics, vol. 30, 2011, pp. 2650-2653.
Bugnicourt et al., "Polyhydroxyalkanoate (PHA): Review of Synthesis, Characteristics, Processing and Potential Applications in Packaging", Express Polymer Letters, vol. 8, No. 11, 2014, pp. 791-808.
Cai et al., "Stereoselective Ring-Opening Polymerization of Racemic Lactide using Alkoxy-Amino-Bis(Phenolate) Group 3 Metal Complexes", Chemical Communications, No. 3, 2004, pp. 330-331.
Cai et al., "Synthesis, Structure and Reactivity of New Yttrium Bis(Dimethylsilyl)Amido and Bis(Trimethylsilyl)Methyl Complexes of a Tetradentate Bis(Phenoxide) Ligand", Journal of Organometallic Chemistry, vol. 683, 2003, pp. 131-136.
Carpentier, Jean-François, "Discrete Metal Catalysts for Stereoselective Ring-Opening Polymerization of Chiral Racemic β-Lactones", Macromolecular Rapid Communications, vol. 31, 2010, pp. 1696-1705.
Carpentier, Jean-François, "Rare-Earth Complexes Supported by Tripodal Tetradentate Bis(phenolate) Ligands: A Privileged Class of Catalysts for Ring-Opening Polymerization of Cyclic Esters", Organometallics, vol. 34, No. 17, 2015, pp. A-O.
Chapurina et al., "Scandium Versus Yttrium{Amino-Alkoxy-Bis(Phenolate)} Complexes for the Stereoselective Ring-Opening Polymerization of Racemic Lactide and β-Butyrolactone", Dalton Transactions, vol. 43, 2014, 12 pages.

(Continued)

*Primary Examiner* — Robert C Boyle
(74) *Attorney, Agent, or Firm* — Adler Pollock & Sheehan P.C.

(57) ABSTRACT

The present invention discloses new catalyst systems based on trivalent metal complexes of Formula I, which can facilitate the stereospecific ring-opening polymerization of (rac)-β-Butyrolactone (rac-BBL). Also provided is a process for the stereospecific synthesis of aliphatic polyesters using the catalysts of Formula I, including alcohols and polyols as chain-transfer agents to facilitate immortal ring-opening polymerization.

10 Claims, 14 Drawing Sheets

(56) References Cited

OTHER PUBLICATIONS

Chen, Guo-Qiang, "A Microbial Polyhydroxyalkanoates (PHA) based Bio- and Materials Industry", Chemical Society Reviews, vol. 38, 2009, pp. 2434-2446.

Dietrich et al., "Sounding out the Reactivity of Trimethylyttrium", Organometallics, vol. 25, No. 18, 2006, pp. 4316-4321.

Dyer et al., "Ring-Opening Polymerization of rac-Lactide by Bis(phenolate)amine-Supported Samarium Borohydride Complexes: An Experimental and DFT Study", Organometallics, vol. 29, No. 16, 2010, pp. 3602-3621.

Ebrahimi et al., "Highly Active Chiral Zinc Catalysts for Immortal Polymerization of β-Butyrolactone Form Melt Processable Syndio-Rich Poly(hydroxybutyrate)", Macromolecules, vol. 49, 2016, pp. A-M.

Ebrahimi et al., "Synthesis and Rheological Characterization of Star-Shaped and Linear Poly(Hydroxybutyrate)", Macromolecules, vol. 48, No. 18, 2015, pp. A-J.

Fang et al., "Yttrium Catalysts for Syndioselective β-Butyrolactone Polymerization: on the Origin of Ligand-Induced Stereoselectivity", Polymer Chemistry, vol. 4, 2013, pp. 360-367.

Fueno et al., "Probabilistic Considerations of the Tacticity of Optically Active Polymers", Journal of Polymer Science: Part A, vol. 3, 1965, pp. 1279-1288.

Gross et al., "Biodegradable Polymers for the Environment", Science, vol. 297, Aug. 2, 2002, pp. 803-807.

Grunova et al., "Group 3 Metal Complexes Supported by Tridentate Pyridine- and Thiophene-Linked Bis(Naphtholate) Ligands: Synthesis, Structure, and Use in Stereo-Selective Ring-Opening Polymerization of Racemic Lactide and β-Butyrolactone", Dalton Transactions, vol. 39, 2010, pp. 6739-6752.

Kemnitzer et al., "Preparation of Predominantly Syndiotactic Poly(β-Hydroxybutyrate) by the Tributyltin Methoxide Catalyzed Ring-Opening Polymerization of Racemic β-butyrolactone", Macromolecules, vol. 26, No. 6, 1993, pp. 1221-1229.

Kemnitzer et al., "Syndiospecific Ring-Opening Polymerization of β-Butyrolactone to form Predominantly Syndiotactic Poly(β-Hydroxybutyrate) using Tin(IV) Catalysts", Macromolecules, vol. 26, No. 3, Nov. 8, 1993, pp. 6143-6150.

Klitzke et al., "Yttrium- and Aluminum-Bis(phenolate)pyridine Complexes: Catalysts and Model Compounds of the Intermediates for the Stereoselective Ring-Opening Polymerization of Racemic Lactide and β-Butyrolactone", Organometallics, vol. 33, 2014, pp. A-M.

Kramer et al., "Polymerization of Enantiopure Monomers using Syndiospecific Catalysts: A New Approach to Sequence Control in Polymer Synthesis", Journal of the American Chemical Society, vol. 131, No. 44, 2009, pp. 16042-16044.

Kumagai et al., "Physical Properties and Biodegradability of Blends of Isotactic and Atactic Poly(3-Hydroxybutyrate)", Makromolekulare Chemie, Rapid Communications, vol. 13, 1992, pp. 179-183.

Le Borgne et al., "Stereoelective Polymerization of β-Butyrolactone", Polymer, vol. 30, Dec. 1989, pp. 2312-2319.

Noda et al., "Preparation and Properties of a Novel Class of Polyhydroxyalkanoate Copolymers", Biomacromolecules, vol. 6, No. 2, 2005, pp. 580-586.

Raza et al., "Polyhydroxyalkanoates: Characteristics, Production, Recent Developments and Applications", International Biodeterioration & Biodegradation, vol. 126, 2018, pp. 45-56.

Rehm, Bernd H. A, "Bacterial Polymers: Biosynthesis, Modifications and Applications", Nature Reviews Microbiology, vol. 8, Aug. 2010, pp. 578-592.

Reichardt et al., "Factors Influencing the Ring-Opening Polymerization of Racemic β-Butyrolactone Using CrIII (salphen)", Macromolecules, vol. 43, No. 22, 2010, pp. 9311-9317.

Rieth et al., "Single-Site βDiiminate Zinc Catalysts for the Ring-Opening Polymerization of β-Butyrolactone and β-Valerolactone to Poly(3-Hydroxyalkanoates)", Journal of the American Chemical Society, vol. 124, No. 51, 2002, pp. 15239-15248.

Sangroniz et al., "Packaging Materials with desired Mechanical and Barrier Properties and Full Chemical Recyclability", Nature Communications, vol. 10, 2019, pp. 1-7.

Save et al., "Controlled Ring-Opening Polymerization of Lactones and Lactides Initiated by Lanthanum Isopropoxide, 1. General Aspects and Kinetics", Macromolecular Chemistry and Physics, vol. 203, No. 5/6, 2002, pp. 889-899.

Shaik et al., "Cyclic and Linear Polyhydroxylbutyrates from Ring-Opening Polymerization of β-Butyrolactone with Amido-Oxazolinate Zinc Catalysts", Macromolecules 2018, vol. 52, No. 1, 2019, pp. A-J.

Tang et al., "Chemical Synthesis of Perfectly Isotactic And High Melting Bacterial Poly(3-Hydroxybutyrate) From Bio-Sourced Racemic Cyclic Diolide", Nature Communications, vol. 9, 2018, pp. 1-11.

Terrier et al., "Supported Neodymium Catalysts for Isoprene and rac-β-Butyrolactone Polymerization: Modulation of Reactivity by Controlled Grafting", Macromolecular Rapid Communications, vol. 32, 2011, pp. 215-219.

Timmins et al., "Effect of Tacticity on Enzymatic Degradability of Poly(β-Hydroxybutyrate)", Macromolecular Chemistry and Physics, vol. 197, 1996, pp. 1193-1215.

Yuen et al., "Synthesis and Catalytic Properties of Phenylene-Bridged Binuclear Organolanthanide Complexes", Organometallics, vol. 27, No. 2, Jan. 28, 2008, pp. 155-158.

Zhu et al., "Catalyst's Sidearm-Induced Stereoselectivity Switching in Polymerization of a Racemic Lactone for Stereocomplexed Crystalline Polymer with a Circular Life Cycle", Angewandte Chemie International Edition, vol. 58, 2019, 5 pages.

Zhu et al., "Sustainable Polymers from Renewable Resources", Nature, vol. 540, Dec. 15, 2016, pp. 354-362.

Zhuo et al., "Stereo-Selectivity Switchable ROP of rac-β-Butyrolactone Initiated by Salan-Ligated Rare-Earth Metal Amide Complexes: The Key Role of the Substituents on Ligand Frameworks", Chemical Communications, vol. 54, No. 85, 2018, pp. 1-5.

Amgoune et al., Ring-Opening Polymerization of Lactide with Group 3 Metal Complexes Supported by Dianionic Alkoxy-Amino-Bisphenolate Ligands: Combining High Activity, Productivity, and Selectivity, Chem. Eur. Journal, vol. 12, Issue 1, 2006, pp. 169-179.

* cited by examiner $^1$H-NMR (CDCl$_3$, 400 MHz) spectra of Compound 2 ($^1$L)

$^{13}$C-NMR (CDCl$_3$, 101 MHz) spectra of Compound 2 ($^1$L)

$^1$H-NMR (C$_6$D$_6$, 400 MHz) spectra of compound 2 ($^1$L)

$^1$H-NMR (C$_6$D$_6$, 600 MHz) spectra of compound 3 (1-La)

$^{13}$C-NMR (C$_6$D$_6$, 152 MHz) spectra of compound 3 (1-La)

$^1$H-NMR (C$_6$D$_6$, 600 MHz) spectra of 1-La(TPPO)$_2$.

$^{13}$C-NMR (C$_6$D$_6$, 152 MHz) spectra of 1-La(TPPO)$_2$.

31P-NMR (C6D6, 243 MHz) spectra of 1-La(TPPO)2.

$^1$H-NMR (C$_6$D$_6$, 600 MHz) spectra of 1-Y(TPPO)$_2$. (*: THF; **: toluene; #: complex resulted from TPPO dissociation).

$^{13}$C-NMR (C$_6$D$_6$, 152 MHz) spectra of 1-Y(TPPO)$_2$. (*: THF; : toluene; *: HN(SiHMe$_2$)$_2$).

$^{31}$P-NMR (C$_6$D$_6$, 243 MHz) spectra of 1-Y(TPPO)$_2$.

Visual Representation of Atactic, syndiotactic, and isotactic P3HB and associated $P_m$ values MALDI-TOF spectrum of P3HB, produced in toluene at ambient temperature

CATALYST AND PROCESS FOR RING OPENING POLYMERIZATION

CROSS REFERENCE TO RELATED APPLICATIONS

This application claims priority from U.S. Provisional Patent Application No. 62/950,702 filed Dec. 19, 2019, the contents of which are incorporated herein in their entirety.

BACKGROUND OF THE INVENTION

Biodegradable polymers have received increasing attention as sustainable alternatives to petroleum-based materials for a wide range of applications, including disposable packaging, biomedical devices, and pharmaceuticals. Aliphatic polyesters, in particular poly(hydroxyalkanoate)s (PHAs), are among the most promising candidates. Poly(3-hydroxybutyrate) (P3HB) is the most common member, and is produced naturally by numerous bacteria and algae to yield a crystalline thermoplastic polyester with thermal and mechanical properties comparable to isotactic polypropylene. Unfortunately, the current high cost of production via fermentation and processing challenges due to the material's thermal decomposition beginning slightly above its melting temperature range, restrict scale and applications. Alternatively, P3HB can be produced via the ring-opening polymerization (ROP) of beta-butyrolactone (BBL) through homogeneous or heterogeneous catalysis. This route offers several key advantages including speed, cost, and scalability, and provides the opportunity to control polymer properties through appropriate catalyst design and co-polymerization strategies. While a variety of catalysts have been developed for the ring opening polymerization (ROP) of rac-BBL over the past 50+ years, control of polymer stereochemistry remains a significant and open challenge.

The relative stereochemistry (i.e. tacticity) of P3HB has a dramatic impact on the resulting mechanical, thermal, and degradation properties, which are critical for their applications. For example, atactic P3HB is an amorphous material with a melting temperature range ($T_m$) of only ~91° C. and poor mechanical strength, while syndiotactic and isotacic P3HB are highly crystalline and have melting temperature range ($T_m$) up to 185° C. Key advances in catalyst design have provided access to highly syndiotactic P3HB for a range of metal centers and supporting ligands, where Carpentier and coworkers have reached $P_r$ values of 0.94 using $Y^{III}$-based initiators supported by tripodal amino-diphenolate ligands. In contrast, access to highly isotactic P3HB is extremely limited. The highest isoselectivity reported to date ($P_m$=0.85) was achieved by Thomas and coworkers with $Nd^{III}$ borohydrides supported on silica. Cui and coworkers also recently reported the highest isoselectivity from a homogeneous catalyst ($P_m$=0.72 at 25° C., 0.77 at 0° C.) using a $Yb^{III}$ amide coordinated by a substituted salan ligand. Notably, Chen and coworkers have developed an elegant alternative strategy to overcome these catalyst design challenges. Perfectly isotactic P3HB was obtained using a designer 8-membered diolide sourced from dimethyl succinate; however, monomer synthesis requires 4 steps in 13% overall yield.

Amongst the various catalysts for the stereospecific ROP of rac-BBL, Carpentier's trivalent rare-earth ($RE^{III}$) complexes supported by tripodal amino-diphenolate ligands stand out as "privileged" structures due to their superior activity and selectivity in stereospecific ROP (Carpentier, J.-F., Rare-Earth Complexes Supported by Tripodal Tetradentate Bis(phenolate) Ligands: A Privileged Class of Catalysts for Ring-Opening Polymerization of Cyclic Esters. *Organometallics* 2015, 34 (17), 4175-4189). Despite numerous modifications to these catalysts (e.g. aryloxide substitution, donor, donor tether, initiator, and rare-earth), the presence/absence of a tethered donor group has almost been completely unexplored (Dyer, H. E.; Huijser, S.; Susperregui, N.; Bonnet, F.; Schwarz, A. D.; Duchateau, R.; Maron, L.; Mountford, P., Ring-Opening Polymerization of rac-Lactide by Bis(phenolate)amine-Supported Samarium Borohydride Complexes: An Experimental and DFT Study. *Organometallics* 2010, 29 (16), 3602-3621.) We found this particularly surprising given two key recent results: (1) Chen and coworkers (Zhu, J.-B.; Chen, E. Y.-X., Catalyst-Side-arm-Induced Stereoselectivity Switching in Polymerization of a Racemic Lactone for Stereocomplexed Crystalline Polymer with a Circular Life Cycle. *Angewandte Chemie International Edition* 2019, 58 (4), 1178-1182) discovered that opposite polymer tacticities of a fused bicyclic lactone can be accessed by changing the identity of the catalyst's tethered-donor group and (2) Cui and coworkers observed reversals in P3HB tacticity depending on the catalyst's nitrogen substituent in the supporting salan ligand (Zhuo, Z.; Zhang, C.; Luo, Y.; Wang, Y.; Yao, Y.; Yuan, D.; Cui, D., Stereo-selectivity switchable ROP of rac-β-butyrolactone initiated by salan-ligated rare-earth metal amide complexes: the key role of the substituents on ligand frameworks. *Chemical Communications* 2018, 54 (85), 11998-12001).

Given the demand for controlling stereoselectivity/tacticity of P3HB there is a need to develop catalysts that can help synthesize polymers with desired mechanical and biodegradable properties. With the foregoing need for new catalysts in mind, we started studying catalysts without a tethered donor group and its influence on the stereospecific ROP of rac-BBL for rare-earth amino-diphenolate catalysts. Herein we report that the absence of the tethered donor group can lead to a catalyst system capable of producing the most isoselective P3HB achieved through ROP of rac-BBL by a homogeneous catalyst to date as represented of the Pm values in Table 1. To achieve isoselectivity the desired $P_m$ values are greater than 0.5.

BRIEF SUMMARY OF THE INVENTION

This invention, in one aspect, provides a compound of Formula I:

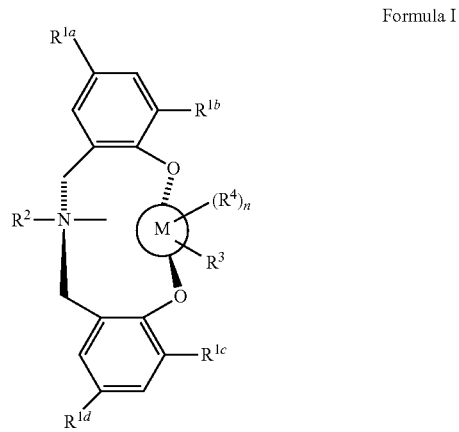

Formula I $R^{1a}$, $R^{1b}$, $R^{1c}$, and $R^{1d}$ independently at each occurrence are selected from H, $C_1$-$C_4$ straight chain alkyl, $C_{3-10}$ branched alkyl, $C_{3-10}$ cyclo alkyl, $C_1$-$C_4$ straight chain alkyl substituted with up to four aryl groups, $C_{3-10}$ branched alkyl substituted with up to 4 aryl groups, $C_{3-10}$ cyclo alkyl substituted with up to 4 aryl groups, alkoxy aryl, thio-alkoxy, thio-alkoxy aryl, $C_{6-10}$ aryl, $C_{4-10}$ heteroaryl, halide, alkoxy, $C(O)OC_{1-4}$ alkyl, $N(R^{14})_2$, aryl-oxy, and halo-alkyl;

$R^2$ is selected from H, branched alkyl, alkyl, alkyl-aryl, silyl-$(R^{31})_3$, alkyl-silyl$(R^{31})_3$, and optionally substituted aryl;

$R^3$ is selected from $C(R^{13})_3$, $N(R^{13})_2$, $OR^{13}$, and $SR^{13}$;

$R^4$ independently at each occurrence is selected from

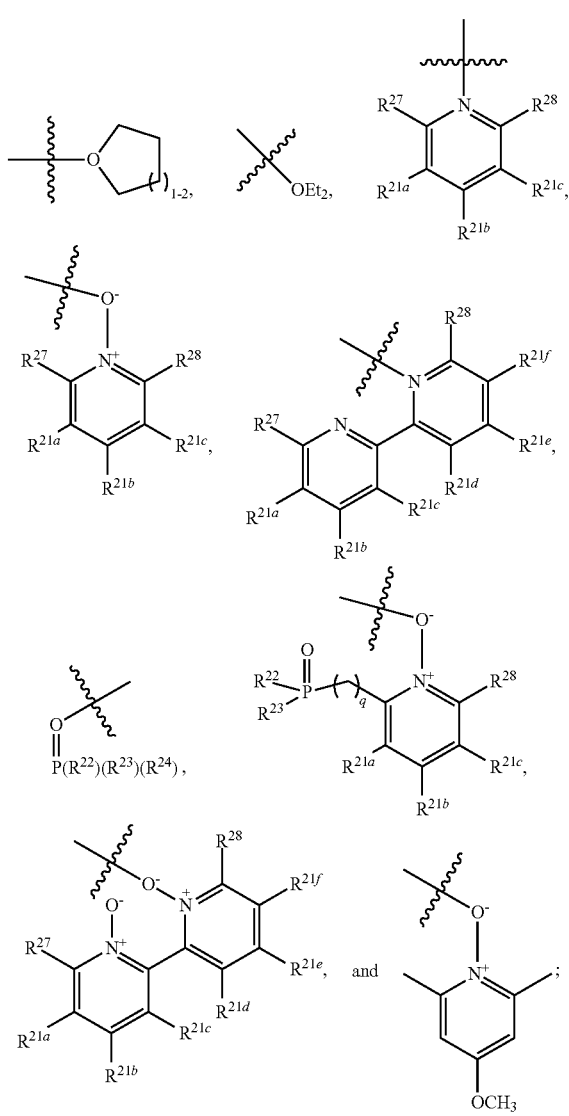

M is selected from rare earth group of elements and group 13 elements;

"n" represents an integer from 1 to 4;

"q" represents an integer from 0 to 6;

$R^{13}$ independently at each occurrence is selected from $OCH(aryl)_2$, $C_1$-$C_4$ straight chain alkyl, $C_{3-8}$ branched alkyl, $C_{3-8}$ cyclo alkyl, alkoxy aryl, thio-alkoxy, thio-alkoxy aryl, $C_{6-10}$ aryl, $C_{4-10}$ heteroaryl, halide, alkoxy, primary amine, tertiary amine, aryl-oxy, Si—($C_1$-$C_4$ straight chain alkyl)$_3$, SiH—($C_1$-$C_4$ straight chain alkyl)$_2$, and halo-alkyl;

$R^{14}$ independently at each occurrence is selected from $C_1$-$C_4$ straight chain alkyl, $C_{3-8}$ branched alkyl, $C_{3-8}$ cyclo alkyl, $C_{6-10}$ aryl, $C_{4-10}$ heteroaryl, C(O)—$C_1$-$C_4$ straight chain alkyl, C(O)—$C_{3-8}$ branched alkyl, C(O) $C_{3-8}$ cyclo alkyl, C(O)—$C_{6-10}$ aryl, C(O)—$C_{4-10}$ heteroaryl Si—($C_1$-$C_4$ straight chain alkyl)$_3$, SiH—($C_1$-$C_4$ straight chain alkyl)$_2$, and halo-alkyl;

$R^{21a}$, $R^{21b}$, $R^{21c}$, $R^{21d}$, $R^{21e}$, and $R^{21f}$ independently at each occurrence are selected from $NO_2$, CN, CHO, COOH, $CONH_2$, $C_1$-$C_4$ straight chain alkyl, $C_{3-8}$ branched alkyl, $C_{3-8}$ cyclo alkyl, $C_{6-10}$ aryl, $C_{4-10}$ heteroaryl, C(O)—$C_1$-$C_4$ straight chain alkyl, C(O)—$C_{3-8}$ branched alkyl, C(O)$C_{3-8}$ cyclo alkyl, C(O)—$C_{6-10}$ aryl, C(O)—$C_{4-10}$ heteroaryl Si—($C_1$-$C_4$ straight chain alkyl)$_3$, SiH—($C_1$-$C_4$ straight chain alkyl)$_2$, H, N$(R^{26})_2$, $OR^{26}$, and halo-alkyl;

$R^{22}$, $R^{23}$, and $R^{24}$ independently at each occurrence are selected from substituted and unsubstituted amines, from $C_1$-$C_4$ straight chain alkyl, $C_{3-8}$ branched alkyl, aryl, heteroaryl, $C_{3-8}$ cyclo alkyl, $CR^{13}$, $(CH_2)_{1-6}P(O)(R^{25})_3$, and $N(R^{13})_2$;

$R^{25}$ represents alkyl or aryl;

$R^{26}$ represents alkyl; and $R^{27}$ and $R^{28}$ independently at each occurrence is selected from O—$R^{26}$, halogen, H and $C_1$-$C_4$-alkyl.

Another embodiment provides a compound of Formula I, wherein:

$R^{1a}$, $R^{1b}$, $R^{1c}$, and $R^{1d}$ independently at each occurrence are selected from H, methyl, t-butyl, cumyl, and triphenylmethyl;

$R^2$ is selected from benzyl, $CH(CH_3)_2$, $CH_2$-hexyl, and t-butyl;

$R^3$ is selected from $N(R^{13})_2$, $C(R^{13})_3$, and $OR^{13}$;

$R^4$ is selected from

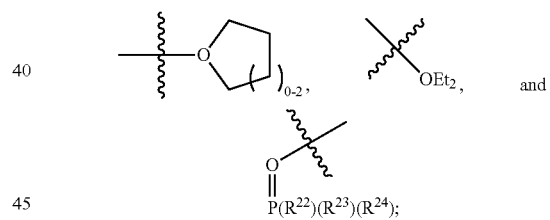

$R^{13}$ independently at each occurrence is selected from $C_1$-$C_4$ straight chain alkyl, $C_{3-6}$ branched alkyl, $C_{3-6}$ cyclo alkyl, $C_{6-8}$ aryl, $C_{5-9}$ heteroaryl, alkyl-aryl, tertiary amine, aryl-oxy, Si—($C_1$-$C_4$ straight chain alkyl)$_3$, and SiH—($C_1$-$C_4$ straight chain alkyl)$_2$;

$R^{22}$, $R^{23}$ and $R^{24}$ independently at each occurrence are selected from substituted and unsubstituted amines, $C_1$-$C_4$ straight chain alkyl, $C_{3-8}$ cyclo alkyl, aryl, heteroaryl, $(CH_2)_{1-6}P(O)(R^{25})_3$, $(CH_2)_{1-6}O(R^{25})$, $(CH_2)_{1-6}N(R^{25})_2$, and $N(R^{13})_2$; and $R^{25}$ represents alkyl or aryl.

Provided in another aspect of the invention is a process for stereospecific synthesis of aliphatic esters of Formula X:

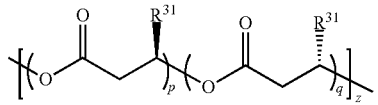

wherein:

R$^{31}$ is selected from C$_{1-4}$ alkyl, C$_{3-8}$ saturated or unsaturated alkyl, C$_{3-8}$ branched or cyclo alkyl, (CH$_2$)$_{0-3}$ aryl, allyl, and —COO—R$^2$;

R$^{32}$ is selected from C$_1$-C$_4$ straight chain alkyl, C$_{3-8}$ branched alkyl, C$_{3-8}$ cyclo alkyl, C$_{6-10}$ aryl, C$_{4-10}$ heteroaryl, and Si—(C$_1$-C$_4$ straight chain alkyl)$_3$;

"p" and "q" independently represent a number from 1 to 100; and

"z" represents a number from 2 to about 200;

said process comprising:

(a) contacting a compound of Formula II

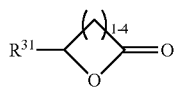

with an alcohol, an optional ligand, and a compound of Formula I

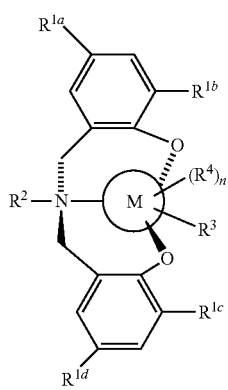

Formula I

R$^{1a}$, R$^{1b}$, R$^{1c}$, and R$^{1d}$ independently at each occurrence are selected from H, C$_1$-C$_4$ straight chain alkyl, C$_{3-10}$ branched alkyl, C$_{3-10}$ cyclo alkyl, C$_1$-C$_4$ straight chain alkyl substituted with up to four aryl groups, C$_{3-10}$ branched alkyl substituted with up to 4 aryl groups, C$_{3-10}$ cyclo alkyl substituted with up to 4 aryl groups, alkoxy aryl, thio-alkoxy, thio-alkoxy aryl, C$_{6-10}$ aryl, C$_{4-10}$ heteroaryl, halide, alkoxy, C(O)OC$_{1-4}$ alkyl, N(R$^{14}$)$_2$, aryl-oxy, and halo-alkyl;

R$^2$ is selected from H, branched alkyl, alkyl, alkyl-aryl, silyl-(R$^{31}$)$_3$, alkyl-silyl(R$^{31}$)$_3$, and optionally substituted aryl;

R$^3$ is selected from C(R$^{13}$)$_3$, N(R$^{13}$)$_2$, OR$^{13}$, and SR$^{13}$;

R$^4$ independently at each occurrence is selected from

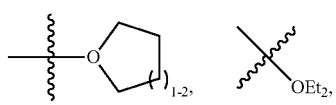 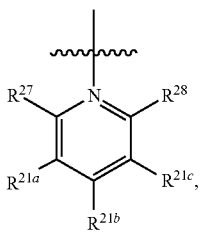

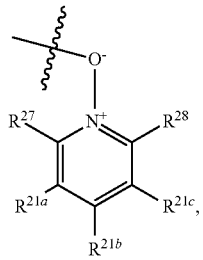 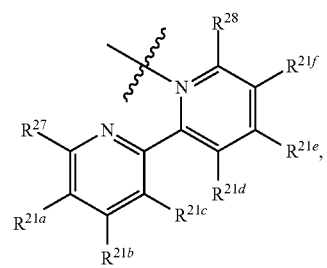

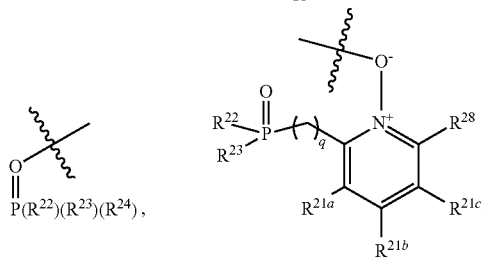

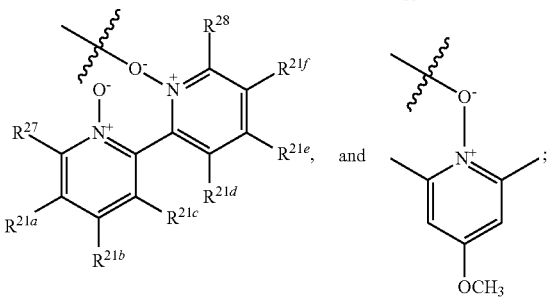

M is selected from rare earth group of elements and group 13 elements;

"n" represents an integer from 1 to 4;

"q" represents an integer from 0 to 6;

R$^{13}$ independently at each occurrence is selected from OCH(aryl)$_2$, C$_1$-C$_4$ straight chain alkyl, C$_{3-8}$ branched alkyl, C$_{3-8}$ cyclo alkyl, alkoxy aryl, thio-alkoxy, thio-alkoxy aryl, C$_{6-10}$ aryl, C$_{4-10}$ heteroaryl, halide, alkoxy, primary amine, tertiary amine, aryl-oxy, Si—(C$_1$-C$_4$ straight chain alkyl)$_3$, SiH—(C$_1$-C$_4$ straight chain alkyl)$_2$, and halo-alkyl;

R$^{14}$ independently at each occurrence is selected from C$_1$-C$_4$ straight chain alkyl, C$_{3-8}$ branched alkyl, C$_{3-8}$ cyclo alkyl, C$_{6-10}$ aryl, C$_{4-10}$ heteroaryl, C(O)—C$_1$-C$_4$ straight chain alkyl, C(O)—C$_{3-8}$ branched alkyl, C(O) C$_{3-8}$ cyclo alkyl, C(O)—C$_{6-10}$ aryl, C(O)—C$_{4-10}$ heteroaryl Si—(C$_1$-C$_4$ straight chain alkyl)$_3$, SiH—(C$_1$-C$_4$ straight chain alkyl)$_2$, and halo-alkyl;

R$^{21a}$, R$^{21b}$, R$^{21c}$, R$^{21d}$, R$^{21e}$, and R$^{21f}$ independently at each occurrence are selected from NO$_2$, CN, CHO, COOH, CONH$_2$, C$_1$-C$_4$ straight chain alkyl, C$_{3-8}$ branched alkyl, C$_{3-8}$ cyclo alkyl, C$_{6-10}$ aryl, C$_{4-10}$ heteroaryl, C(O)—C$_1$-C$_4$ straight chain alkyl, C(O)—C$_{3-8}$ branched alkyl, C(O)C$_{3-8}$ cyclo alkyl, C(O)—C$_{6-10}$ aryl, C(O)—C$_{4-10}$ heteroaryl Si—(C$_1$-C$_4$ straight chain alkyl)$_3$, SiH—(C$_1$-C$_4$ straight chain alkyl)$_2$, H, N(R$^{26}$)$_2$, OR$^{26}$, and halo-alkyl;

R$^{22}$, R$^{23}$ and R$^{24}$ independently at each occurrence are selected from substituted and unsubstituted amines, from C$_1$-C$_4$ straight chain alkyl, C$_{3-8}$ branched alkyl, aryl, heteroaryl, C$_{3-8}$ cyclo alkyl, CR$^{13}$, (CH$_2$)$_{1-6}$P(O)(R$^{25}$)$_3$, and N(R$^{13}$)$_2$;

$R^{25}$ represents alkyl or aryl;

$R^{26}$ represents alkyl; and $R^{27}$ and $R^{28}$ independently at each occurrence is selected from O—$R^{26}$, halogen, H, and $C_1$-$C_4$-alkyl; to form a mixture, and (b) agitating said mixture at a temperature ranging from about −50° C. to about +50° C. from about 5 mins to about 48 hours to yield a compound of Formula X.

BRIEF DESCRIPTION OF THE DRAWINGS

For the purpose of illustration, certain embodiments of the present invention are shown in the drawings described below. Like numerals in the drawings indicate like elements throughout. It should be understood, however, that the invention is not limited to the precise arrangements, dimensions, and instruments shown. In the drawings.

DETAILED DESCRIPTION OF THE INVENTION

Figure 1:
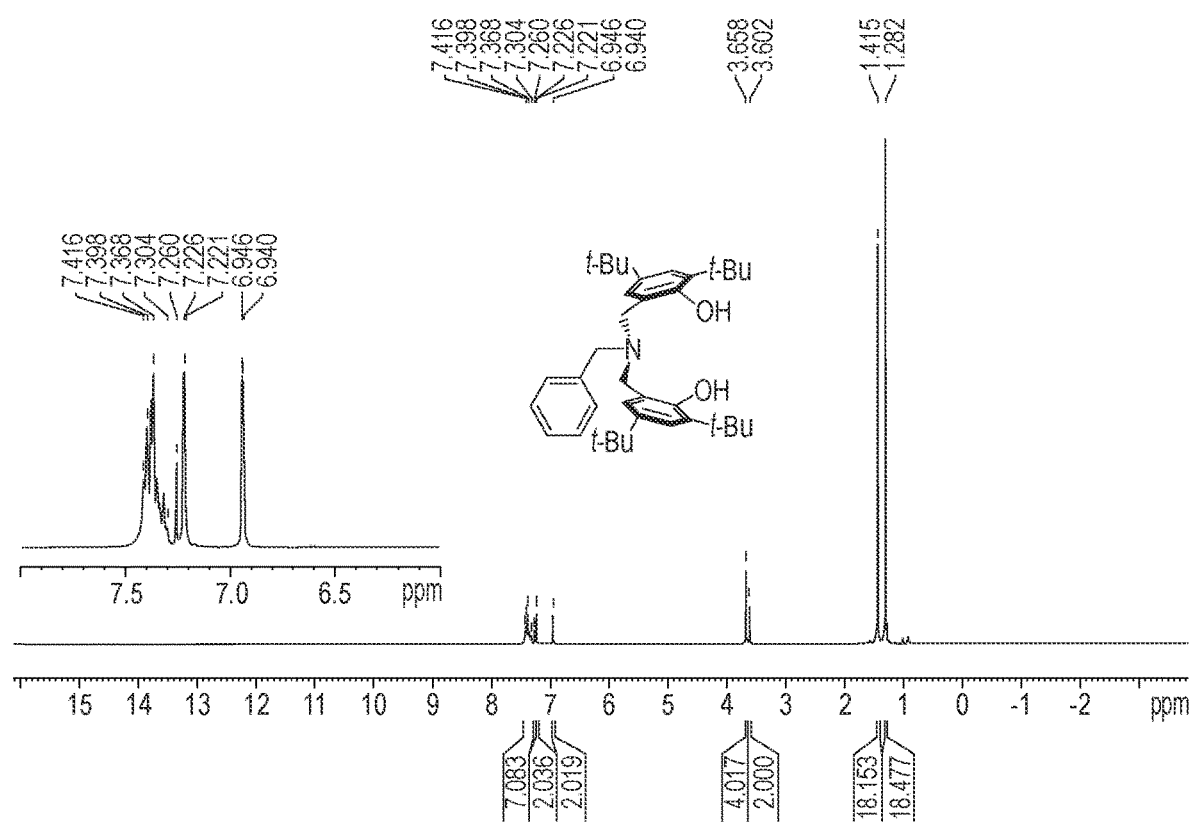
FIG. 1: $^1$H-NMR (CDCl$_3$, 400 MHz) spectra of Compound 2 ($^1$L)

This invention in one aspect provides a compound of Formula I:

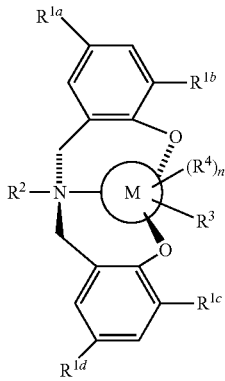

Formula I $R^{1a}$, $R^{1b}$, $R^{1c}$, and $R^{1d}$ independently at each occurrence are selected from H, $C_1$-$C_4$ straight chain alkyl, $C_{3-10}$ branched alkyl, $C_{3-10}$ cyclo alkyl, $C_1$-$C_4$ straight chain alkyl substituted with up to four aryl groups, $C_{3-10}$ branched alkyl substituted with up to 4 aryl groups, $C_{3-10}$ cyclo alkyl substituted with up to 4 aryl groups, alkoxy aryl, thio-alkoxy, thio-alkoxy aryl, $C_{6-10}$ aryl, $C_{4-10}$ heteroaryl, halide, alkoxy, C(O)O$C_{1-4}$ alkyl, N($R^{14}$)$_2$, aryl-oxy, and halo-alkyl;

$R^2$ is selected from H, branched alkyl, alkyl, alkyl-aryl, silyl-($R^{31}$)$_3$, alkyl-silyl($R^{31}$)$_3$, and optionally substituted aryl;

$R^3$ is selected from C($R^{13}$)$_3$, N($R^{13}$)$_2$, O$R^{13}$, and S$R^{13}$;

$R^4$ independently at each occurrence is selected from

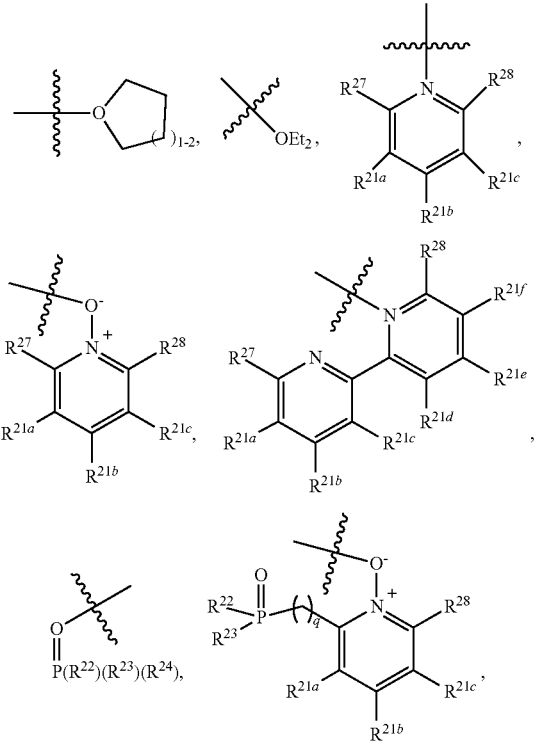

-continued

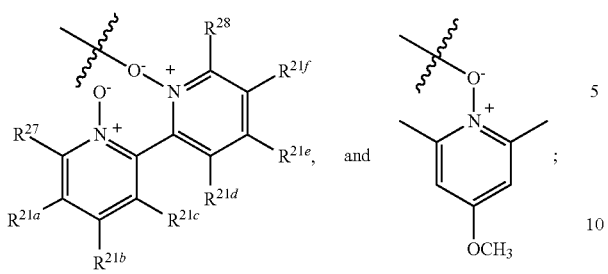

M is selected from rare earth group of elements and group 13 elements;

"n" represents an integer from 1 to 4;

"q" represents an integer from 0 to 6;

$R^{13}$ independently at each occurrence is selected from $OCH(aryl)_2$, $C_1$-$C_4$ straight chain alkyl, $C_{3-8}$ branched alkyl, $C_{3-8}$ cyclo alkyl, alkoxy aryl, thio-alkoxy, thio-alkoxy aryl, $C_{6-10}$ aryl, $C_{4-10}$ heteroaryl, halide, alkoxy, primary amine, tertiary amine, aryl-oxy, Si—$(C_1$-$C_4$ straight chain alkyl$)_3$, SiH—$(C_1$-$C_4$ straight chain alkyl$)_2$, and halo-alkyl;

$R^{14}$ independently at each occurrence is selected from $C_1$-$C_4$ straight chain alkyl, $C_{3-8}$ branched alkyl, $C_{3-8}$ cyclo alkyl, $C_{6-10}$ aryl, $C_{4-10}$ heteroaryl, C(O)—$C_1$-$C_4$ straight chain alkyl, C(O)—$C_{3-8}$ branched alkyl, C(O) $C_{3-8}$ cyclo alkyl, C(O)—$C_{6-10}$ aryl, C(O)—$C_{4-10}$ heteroaryl Si—$(C_1$-$C_4$ straight chain alkyl$)_3$, SiH—$(C_1$-$C_4$ straight chain alkyl$)_2$, and halo-alkyl;

$R^{21a}$, $R^{21b}$, $R^{21c}$, $R^{21d}$, $R^{21e}$, and $R^{21f}$ independently at each occurrence are selected from $NO_2$, CN, CHO, COOH, $CONH_2$, $C_1$-$C_4$ straight chain alkyl, $C_{3-8}$ branched alkyl, $C_{3-8}$ cyclo alkyl, $C_{6-10}$ aryl, $C_{4-10}$ heteroaryl, C(O)—$C_1$-$C_4$ straight chain alkyl, C(O)—$C_{3-8}$ branched alkyl, C(O)$C_{3-8}$ cyclo alkyl, C(O)—$C_{6-10}$ aryl, C(O)—$C_{4-10}$ heteroaryl Si—$(C_1$-$C_4$ straight chain alkyl$)_3$, SiH—$(C_1$-$C_4$ straight chain alkyl$)_2$, H, N$(R^{26})_2$, $OR^{26}$, and halo-alkyl;

$R^{22}$, $R^{23}$, and $R^{24}$ independently at each occurrence are selected from substituted and unsubstituted amines, from $C_1$-$C_4$ straight chain alkyl, $C_{3-8}$ branched alkyl, aryl, heteroaryl, $C_{3-8}$ cyclo alkyl, $CR^{13}$, $(CH_2)_{1-6}P(O)(R^{25})_3$, and $N(R^{13})_2$;

$R^{25}$ represents alkyl or aryl;

$R^{26}$ represents alkyl; and $R^{27}$ and $R^{28}$ independently at each occurrence is selected from O—$R^{26}$, halogen, H, and $C_1$-$C_4$ alkyl.

A preferred embodiment provides a compound of Formula I wherein:

"n" represents an integer from 2 to 3;

"q" represents an integer from 1-3;

$R^{1a}$, $R^{1b}$, $R^{1c}$, and $R^{1d}$ independently at each occurrence are selected from H, methyl, t-butyl, cumyl, and triphenylmethyl;

$R^2$ is selected from benzyl, $CH(CH_3)_2$, $CH_2$-hexyl, methyl, H, and t-butyl;

$R^3$ is selected from $N(R^{13})_2$, $C(R^{13})_3$, and $OR^{13}$;

$R^4$ is selected from

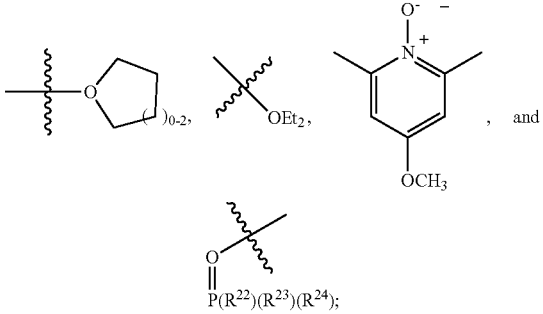

$R^{13}$ independently at each occurrence is selected from $CH_2$-$Ph_2$, $C_1$-$C_4$ straight chain alkyl, $C_{3-6}$ branched alkyl, $C_{3-6}$ cyclo alkyl, $C_{6-8}$ aryl, $C_{5-9}$ heteroaryl, alkylaryl, tertiary amine, aryl-oxy, Si—$(C_1$-$C_4$ straight chain alkyl$)_3$, and SiH—$(C_1$-$C_4$ straight chain alkyl$)_2$;

$R^{22}$, $R^{23}$ and $R^{24}$ independently at each occurrence are selected from substituted and unsubstituted amines, $C_1$-$C_4$ straight chain alkyl, $C_{3-8}$ cyclo alkyl, aryl, heteroaryl, $(CH_2)_{1-6}P(O)(R^{25})_3$, $(CH_2)_{1-6}O(R^{25})$, $(CH_2)_{1-6}N(R^{25})_2$, and $N(R^{13})_2$;

$R^{25}$ represents alkyl or aryl;

$R^{26}$ represents $C_{1-4}$-alkyl; and $R^{27}$ and $R^{28}$ independently at each occurrence is selected from H and $C_1$-$C_4$-alkyl.

Another preferred embodiment provides a compound of Formula I wherein:

$R^3$ represents $C(R^{13})_3$, $OR^{13}$, or $N(R^{13})_2$; and wherein $R^{1a}$, $R^{1b}$, $R^{1c}$, and $R^{1d}$ independently at each occurrence represent t-butyl or cumyl. Yet another preferred embodiment provides a compound of Formula I wherein, $R^3$ represents O—$CH(Ph)_2$, O-i-propyl, or $N(SiHMe_2)_2$.

Provided in another preferred embodiment is a compound of Formula I wherein M represents a rare earth element selected from cerium (Ce), dysprosium (Dy), erbium (Er), europium (Eu), gadolinium (Gd), holmium (Ho), lanthanum (La), lutetium (Lu), neodymium (Nd), praseodymium (Pr), samarium (Sm), terbium (Tb), thulium (Tm), ytterbium (Yb), and yttrium (Y); wherein a further preferred rare earth element is selected from lanthanum (La) and yttrium (Y).

Yet another preferred embodiment provides a compound of Formula I wherein:

$R^4$ is selected from $P(O)(NCH_3)_2)_3$, $P(O)(Ph)_3$, $P(O)(C_8H_{13})$, and

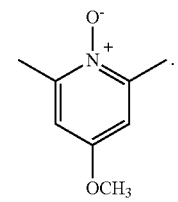

A further preferred embodiment of the present invention provides a compound of Formula I

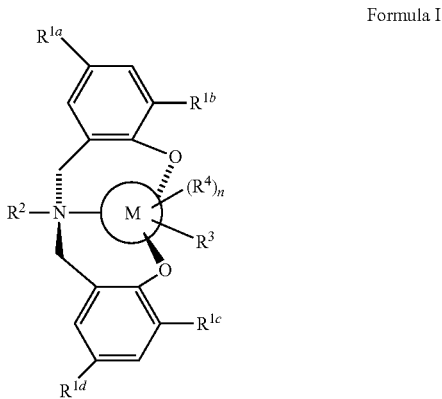

Formula I

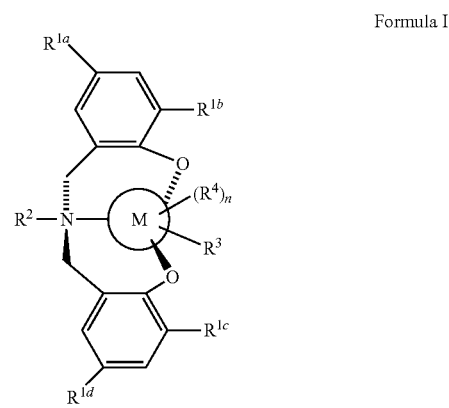

Formula I wherein:
- $R^{1a}$, $R^{1b}$, $R^{1c}$, and $R^{1d}$ independently at each occurrence is selected from Cl, cumyl, and t-butyl;
- $R^2$ is selected from H, ipropyl, methyl, and benzyl;
- $R^3$ is selected from OCH-Ph$_2$, and N(SiHMe$_2$)$_2$;
- $R^4$ independently at each occurrence is selected from OMe-LO, P(O)(NCH$_3$)$_2$)$_3$, P(O)(Ph)$_3$, and P(O)(C$_8$H$_{13}$);
- M represents a rare earth element selected from lanthanum (La) and yttrium (Y); and "n" represents an integer from 2-3.

Provided in another aspect of the invention is a process for stereospecific synthesis of aliphatic esters of Formula X:

wherein:
- $R^{31}$ is selected from $C_1$-4 alkyl, $C_{3-8}$ saturated or unsaturated alkyl, $C_{3-8}$ branched or cyclo alkyl, (CH$_2$)$_{0-3}$ aryl, allyl, and —COO—$R^2$;
- $R^{32}$ is selected from $C_1$-$C_4$ straight chain alkyl, $C_{3-8}$ branched alkyl, $C_{3-8}$ cyclo alkyl, $C_{6-10}$ aryl, $C_{4-10}$ heteroaryl, and Si—(C$_1$-C$_4$ straight chain alkyl)$_3$;
- "p" and "q" independently represent a number from 1 to 100; and
- "z" represents a number from 2 to about 200;

said process comprising:
(a) contacting a compound of Formula II with an alcohol, an optional ligand, and a compound of Formula I wherein:
- $R^{1a}$, $R^{1b}$, $R^{1c}$, and $R^{1d}$ independently at each occurrence are selected from H, $C_1$-$C_4$ straight chain alkyl, $C_{3-10}$ branched alkyl, $C_{3-10}$ cyclo alkyl, $C_1$-$C_4$ straight chain alkyl substituted with up to four aryl groups, $C_{3-10}$ branched alkyl substituted with up to 4 aryl groups, $C_{3-10}$ cyclo alkyl substituted with up to 4 aryl groups, alkoxy aryl, thio-alkoxy, thio-alkoxy aryl, $C_{6-10}$ aryl, $C_{4-10}$ heteroaryl, halide, alkoxy, C(O)OC$_{1-4}$ alkyl, N(R$^{14}$)$_2$, aryl-oxy, and halo-alkyl;
- $R^2$ is selected from H, branched alkyl, alkyl, alkyl-aryl, silyl-(R$^{31}$)$_3$, alkyl-silyl(R$^{31}$)$_3$, and optionally substituted aryl;
- $R^3$ is selected from C(R$^{13}$)$_3$, N(R$^{13}$)$_2$, OR$^{13}$, and SR$^{13}$;
- $R^4$ independently at each occurrence is selected from

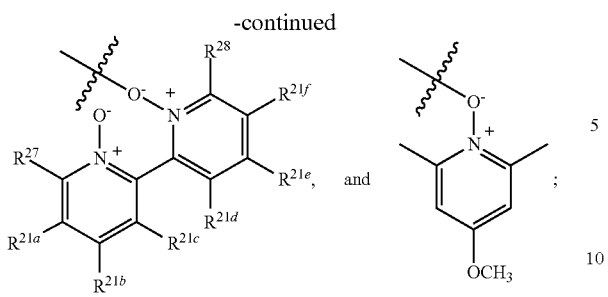

M is selected from rare earth group of elements and group 13 elements;

"n" represents an integer from 1 to 4;

"q" represents an integer from 0 to 6;

$R^{13}$ independently at each occurrence is selected from $OCH(aryl)_2$, $C_1$-$C_4$ straight chain alkyl, $C_{3-8}$ branched alkyl, $C_{3-8}$ cyclo alkyl, alkoxy aryl, thio-alkoxy, thio-alkoxy aryl, $C_{6-10}$ aryl, $C_{4-10}$ heteroaryl, halide, alkoxy, primary amine, tertiary amine, aryl-oxy, Si—($C_1$-$C_4$ straight chain alkyl)$_3$, SiH—($C_1$-$C_4$ straight chain alkyl)$_2$, and halo-alkyl;

$R^{14}$ independently at each occurrence is selected from $C_1$-$C_4$ straight chain alkyl, $C_{3-8}$ branched alkyl, $C_{3-8}$ cyclo alkyl, $C_{6-10}$ aryl, $C_{4-10}$ heteroaryl, C(O)—$C_1$-$C_4$ straight chain alkyl, C(O)—$C_{3-8}$ branched alkyl, C(O) $C_{3-8}$ cyclo alkyl, C(O)—$C_{6-10}$ aryl, C(O)—$C_{4-10}$ heteroaryl Si—($C_1$-$C_4$ straight chain alkyl)$_3$, SiH—($C_1$-$C_4$ straight chain alkyl)$_2$, and halo-alkyl;

$R^{21a}$, $R^{21b}$, $R^{21c}$, $R^{21d}$, $R^{21e}$, and $R^{21f}$ independently at each occurrence are selected from $NO_2$, CN, CHO, COOH, $CONH_2$, $C_1$-$C_4$ straight chain alkyl, $C_{3-8}$ branched alkyl, $C_{3-8}$ cyclo alkyl, $C_{6-10}$ aryl, $C_{4-10}$ heteroaryl, C(O)—$C_1$-$C_4$ straight chain alkyl, C(O)—$C_{3-8}$ branched alkyl, C(O)$C_{3-8}$ cyclo alkyl, C(O)—$C_{6-10}$ aryl, C(O)—$C_{4-10}$ heteroaryl Si—($C_1$-$C_4$ straight chain alkyl)$_3$, SiH—($C_1$-$C_4$ straight chain alkyl)$_2$, H, N($R^{26}$)$_2$, $OR^{26}$, and halo-alkyl;

$R^{22}$, $R^{23}$, and $R^{24}$ independently at each occurrence are selected from substituted and unsubstituted amines, from $C_1$-$C_4$ straight chain alkyl, $C_{3-8}$ branched alkyl, aryl, heteroaryl, $C_{3-8}$ cyclo alkyl, $CR^{13}$, $(CH_2)_{1-6}P(O)$ $(R^{25})_3$, and $N(R^{13})_2$;

$R^{25}$ represents alkyl or aryl;

$R^{26}$ represents alkyl; and $R^{27}$ and $R^{28}$ independently at each occurrence is selected from O—$R^{26}$, halogen, H, and $C_1$-$C_4$-alkyl; to form a mixture, and (b) agitating said mixture at a temperature ranging from about −50° C. to about +50° C. from about 5 mins to about 48 hours to yield a compound of Formula X.

A preferred embodiment of this aspect provides a process for stereospecific synthesis of aliphatic esters of Formula X wherein:

"n" represents an integer from 2 to 3;

"q" represents an integer from 1-3;

$R^{1a}$, $R^{1b}$, $R^{1c}$, and $R^{1d}$ independently at each occurrence are selected from H, methyl, t-butyl, cumyl, and triphenylmethyl;

$R^2$ is selected from benzyl, $CH(CH_3)_2$, $CH_2$-hexyl, methyl, H, and t-butyl;

$R^3$ is selected from $N(R^{13})_2$, $C(R^{13})_3$, and $OR^{13}$;

$R^4$ is selected from

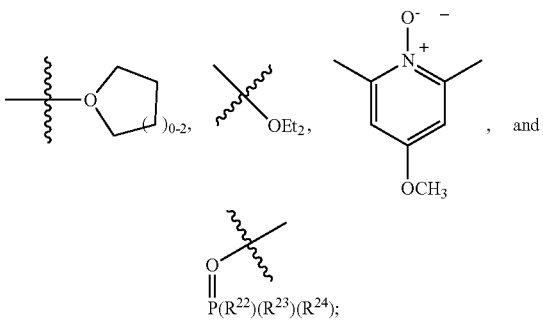

$R^{13}$ independently at each occurrence is selected from $CH_2$-$Ph_2$, $C_1$-$C_4$ straight chain alkyl, $C_{3-6}$ branched alkyl, $C_{3-6}$ cyclo alkyl, $C_{6-8}$ aryl, $C_{5-9}$ heteroaryl, alkyl-aryl, tertiary amine, aryl-oxy, Si—($C_1$-$C_4$ straight chain alkyl)$_3$, and SiH—($C_1$-$C_4$ straight chain alkyl)$_2$;

$R^{22}$, $R^{23}$ and $R^{24}$ independently at each occurrence are selected from substituted and unsubstituted amines, $C_1$-$C_4$ straight chain alkyl, $C_{3-8}$ cyclo alkyl, aryl, heteroaryl, $(CH_2)_{1-6}P(O)(R^{25})_3$, $(CH_2)_{1-6}O(R^{25})$, $(CH_2)_{1-6}$ $N(R^{25})_2$, and $N(R^{13})_2$;

$R^{25}$ represents alkyl or aryl;

$R^{26}$ represents $C_{1-4}$-alkyl; and $R^{27}$ and $R^{28}$ independently at each occurrence is selected from H and $C_1C_4$-alkyl; to form a mixture; and (b) agitating said mixture at a temperature ranging from about −50° C. to about +50° C. from about 5 mins to about 48 hours to yield a compound of Formula X.

Another preferred embodiment of this aspect provides a for stereospecific synthesis of aliphatic esters of Formula X wherein $R^3$ represents $C(R^{13})_3$, $OR^{13}$, or $N(R^{13})_2$.

Another preferred embodiment of this aspect provides a for stereospecific synthesis of aliphatic esters of Formula X wherein $R^{1a}$, $R^{1b}$, $R^{1c}$, and $R^{1d}$ independently at each occurrence represent t-butyl or cumyl; and wherein $R^3$ represents O—$CH(Ph)_2$, O-i-propyl, or $N(SiHMe_2)_2$. Provided in yet another embodiment is a process wherein $R^2$ is H, methyl, i-propyl, or benzyl.

Yet another preferred embodiment of this aspect provides a for stereospecific synthesis of aliphatic esters of Formula X wherein M represents a rare earth element selected from cerium (Ce), dysprosium (Dy), erbium (Er), europium (Eu), gadolinium (Gd), holmium (Ho), lanthanum (La), lutetium (Lu), neodymium (Nd), praseodymium (Pr), samarium (Sm), terbium (Tb), thulium (Tm), ytterbium (Yb), yttrium (Y), and the group 13 elements are selected from B and Al.

Another preferred embodiment of this aspect provides a for stereospecific synthesis of aliphatic esters of Formula X wherein is selected from $P(O)(NCH_3)_2)_3$, $P(O)(Ph)_3$, $P(O)$ $(C_8H_{13})$, and

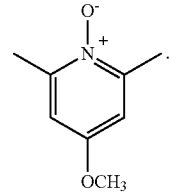

A further preferred embodiment of this aspect provides a for stereospecific synthesis of aliphatic esters of Formula X wherein $R^4$ is selected from OMe-LO, $P(O)(NCH_3)_2)_3$, $P(O)(Ph)_3$, and $P(O)(C_8H_{13})$.

Provided in another preferred embodiment is a process wherein the mixture is agitated at a temperature ranging from about −30° C. to about +30° C. from about 10 minutes to about 24 hours, preferably the mixture is agitated at a temperature ranging from about 0° C. to about +30° C. from about 10 minutes to about 8 hours. Yet another preferred embodiment provides a process wherein the alcohol is an aliphatic alcohol selected from methanol, benzyl alcohol, phenethyl alcohol, ethanol, polyol, and i-propanol, preferably the alcohol being i-propanol.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the certain specific methods and materials are described. As used herein, each of the following terms has the meaning associated with it in this section and as described elsewhere in this specification.

"About" as used herein when referring to a measurable value such as an amount, a temporal duration, and the like, is meant to encompass variations of ±20% or ±10%, more advantageously ±5%, even more advantageously ±1%, and still more advantageously ±0.1% from the specified value, as such variations are appropriate to perform the disclosed methods.

As used herein, the term "alkyl," by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, cyclo-pentyl, cyclo propyl, cyclo butyl, neopentyl, hexyl, cyclopropylmethyl n-pentyl, n-hexyl, and cyclobutyl-propylmethyl.

As used herein, the term Ome-LO represents the structure:

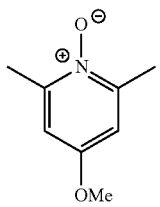

As used herein, the term "cycloalkyl," by itself or as part of another substituent means, unless otherwise stated, a cyclic chain hydrocarbon having the number of carbon atoms designated (i.e., $C_3$-$C_6$ means a cyclic group comprising a ring group consisting of three to six carbon atoms) and includes straight, branched chain or cyclic substituent groups. Examples include cyclopropyl, cyclobutyl, cyclopentyl, cyclohexyl, cycloheptyl, and cyclooctyl. Certain specific examples include ($C_3$-$C_6$)cycloalkyl, such as, but not limited to, cyclopropyl, cyclobutyl, cyclopentyl and cyclohexyl.

As used herein, the term "st. chain alkyl" or "straight chain alkyl" by itself or as part of another substituent means, unless otherwise stated, represents a hydrocarbon having the number of carbon atoms designated (i.e., $C_1$-$C_{10}$ means one to ten carbon atoms). Illustrative examples include ethyl, n-propyl, n-propyl, n-butyl, n-pentyl, and n-hexyl.

As used herein, the term "branched alkyl," by itself or as part of another substituent means, unless otherwise stated, represents a branched chain hydrocarbon having the number of carbon atoms designated (i.e., $C_3$-$C_{10}$ means three to ten carbon atoms) and includes branched chain substituent groups. Illustrative examples include isopropyl, isobutyl, tert-butyl, and neopentyl.

As used herein the term "saturated alkyl" represents an alkyl group (including straight chain alkyl, branched alkyl, cyclo-alkyl) wherein the alkyl group does not include unsaturation (double bond(s), triple bond(s), or any combination thereof).

As used herein the term "unsaturated alkyl" represents an alkyl group comprising/containing at least one site of unsaturation such as a double or a triple bond or combinations thereof. Illustrative examples of an unsaturated alkyl are ethene, propene, butene, pentene, hexene, heptane, octene, and nonene.

As used herein, the term "allyl" employed alone or in combination with other terms, represents a substituent with the structural formula $H_2C=CH-CH_2R$, where R is the rest of the molecule. It consists of a methylene bridge ($-CH_2-$) attached to a vinyl group ($-CH=CH_2$). Illustrative examples of compounds comprising an allyl group are allyl alcohol, allyl chloride, and crotyl alcohol.

The term "primary amine" represents $-NH_2$.

The term secondary amine" represents $-NHR$, wherein "R" represents a substituent other than hydrogen.

As used herein, the term "halo", "halide", or "halogen" alone or as part of another substituent, unless otherwise stated, represents a fluorine, chlorine, bromine, or iodine atom.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: $-O-CH_2-CH_2-CH_3$, $-CH_2-CH_2-CH_2-OH$, $-CH_2-CH_2-NH-CH_3$, $-CH_2-S-CH_2-CH_3$, and $-CH_2CH_2-S(=O)-CH_3$. Up to two heteroatoms may be consecutive, such as, for example, $-CH_2-NH-OCH_3$, or $-CH_2-CH_2-S-S-CH_3$.

As used herein, the term "aryl," employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl. In certain embodiments, aryl includes phenyl and naphthyl, in particular, phenyl.

As used herein, the terms "heterocycle", "heterocyclyl", "heterocyclic" or "hetero cycloalkyl", by itself or as part of another substituent means, unless otherwise stated, an unsubstituted or substituted, stable, mono- or multi-cyclic heterocyclic ring system that consists of carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

As used herein, the term "substituted" means that an atom or group of atoms has replaced hydrogen as the substituent attached to another group.

As used herein, the term "aquatic solvent" represents a solvent which is miscible with water and/or an aliphatic alcohol. Illustrative aquatic solvents, though not meant to limit, are water, aliphatic alcohols including methanol, ethanol, butanol, isobutanol, tertiary butanol, propanol, and isopropanol. Other examples of aquatic solvents are dimethyl sulfoxide (DMSO), tetrahydrofuran (THF), dimethyl sulfoxide (DMF).

As used herein, the term "alkoxy" refers to groups wherein an oxygen atom is attached to an alkyl group. Illustrative examples of alkoxy groups include methoxy (—OCH$_3$), ethoxy (.OCH$_2$CH$_3$), butoxy (—OCH$_2$CH$_2$CH$_3$), and t-butoxy (—OC(CH$_3$)$_2$).

As used herein the terms "alkoxy aryl" and "aryloxy" refers to groups wherein the oxygen atom is attached to an aryl group. Illustrative examples of thio-alkoxy groups include thio-methoxy (—SCH$_3$), thio-ethoxy (.SCH$_2$CH$_3$), thio-butoxy (—SCH$_2$CH$_2$CH$_3$), and thio-t-butoxy (—SC(CH$_3$)$_2$).

As used herein the term "ligand" is intended to represent any Lewis-basic group that can coordinate to a metal center. For example, the aminodiphenolate (containing $R^1$ and $R^2$), as well as $R^3$ and $R^4$ shown in formula 1 are all examples of ligands. When ligand is defined in table 1, this is specifically referring to Lewis-bases as described for $R^4$ in Formula 1.

As used herein the term ambient temperature is intended to represent the average temperature of the environment such as a room and is commonly used to represent the average room temperature without external heating or cooling. Ambient or room temperature can range from about 22° C. to about 27° C.

As used herein the term "thio-alkoxy" refers to groups wherein the Oxygen atom from the alkoxy group is replaced by a Sulfur atom.

As used herein the term "halo alkyl" represents an alkyl group substituted with a halide.

As used herein the term "group 13 elements" represents the boron group of elements and are the chemical elements in group 13 of the periodic table. The group 13 elements include boron, aluminum, gallium, indium, thallium, and nihonium. The group 13 elements are sometimes referred to as the triels.

As used herein the term "alcohol" includes molecules with one hydroxyl group (mono alcohols) and more than one hydroxy group (polyols). Illustrative examples of alcohols include methanol, ethanol, isopropanol, benzyl alcohol, and phenethyl alcohol. Also included within the definition of an "alcohols" are polyols which are defined elsewhere in this application.

As used herein the term "polyol" represents a molecule with more than two hydroxyl groups. The term polyol includes a molecule with two hydroxyl groups (diol), three hydroxyl groups (triol), four hydroxy groups (tetraol), and include glycols having a number average molecular weight within the range of 200 g/mol to 1500 g/mol. Illustrative examples of a polyol are ethylene glycol, diethylene glycol, triethylene glycol, tetraethylene glycol, propylene glycol, dipropylene glycol, tripropylene glycol, 1,3-propanediol, 1,3-butanediol, 2-methyl-1,3-propanediol, 1,4-butanediol, neopentyl glycol, 1,6-hexanediol, 1,2-cyclohexanediol, 1,4-cyclohexanedimethanol, 1,4-benzenedimethanol, hydroquinone bis(2-hydroxyethyl) ether, glycerol, terimethylolpropane, 1,2,6-hexanetriol, triethanolamine, pentaerythritol, butane 1,2,3,4-tetrol, and xylitol.

In this disclosure, "comprises," "comprising," "containing" and "having" and the like can have the meaning ascribed to them in U.S. Patent law and can mean "includes," "including" and the liken "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 2 to 3 should be considered to have specifically disclosed sub-ranges such as from 2.01 to 2.99, from 2.1 to 2.9, from 2.5 to 2.8, etc., as well as individual numbers within that range, for example, 2, 2.3, 2.5, 2.6, 2.7, 2.72 and 2.8. This applies regardless of the breadth of the range.

Experimental Details

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Some compounds of Formula I were synthesized by the general scheme outlined in Scheme IA below:

Scheme IA

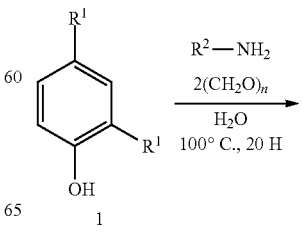

-continued

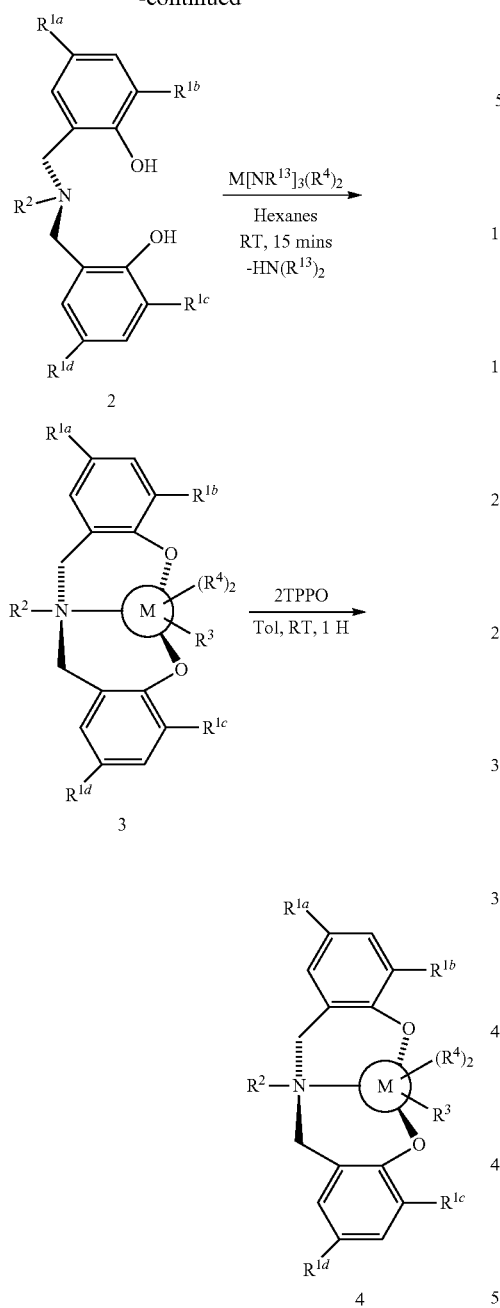

Scheme IB

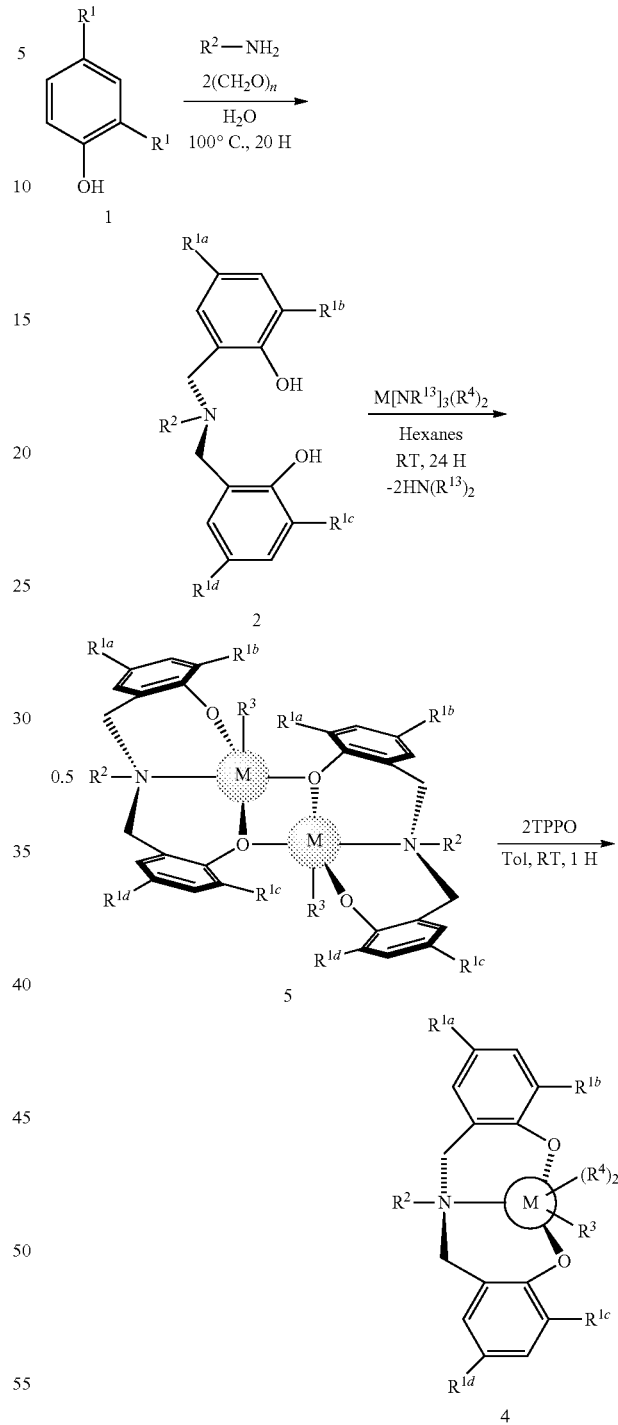

Compounds of Formula I were synthesized in two to three steps. Compound 1 was treated with $R^2$—$NH_2$, and paraformaldehyde $((CH_2O)_n)$ in the presence of water for about 20 hours at a temperature of about 100° C. to yield Compound 2 in about a 98% yield. Compound 2 was then treated at room temperature for about 15 minutes with one equivalent of $M[NR^{13}]_3(THF)_2$ in hexanes to afford Compound 3, which is a compound of Formula I. Compound 3 was (wherein $R^4$=tetrahydrofuran, was then treated with TPPO at room temperature (RT) for about 1 hour in Toluene as solvent to yield Compound 4, also a compound of Formula I, wherein $R^4$ was converted to $P(O)(Ph)_3$.

Compounds of Formula IA were also synthesized as outlined in Scheme IB below:

Compounds of Formula I were also synthesized in two to three steps as outlined in Scheme IB above. Compound 1 was treated with $R^2$—$NH_2$, and paraformaldehyde $((CH_2O)_n)$ in the presence of water for about 20 hours at a temperature of about 100° C. to yield Compound 2 in about a 98% yield. Compound 2 was then treated at room temperature for about 24 hours with one equivalent of $M[NR^{13}]_3$ $(THF)_2$ in hexanes to afford Compound 5, which is a dimer of a compound of Formula I. The dimer Compound 5 (wherein $R^4$=tetrahydrofuran) was then treated with TPPO at room temperature (RT) for about 1 hour in Toluene as solvent to yield Compound 4, a compound of Formula I, wherein the dimer of the Compound of Formula I was now converted to a compound of Formula I, wherein $R^4$ was converted to $P(O)(Ph)_3$.

Synthesis of specific compounds of Formula I is outlined in Scheme II below. Thus in Scheme II below, 1-La represents a compound of Formula I wherein, $R^{1a}$, $R^{1b}$, $R^{1c}$, and $R^{1d}$, represent a t-butyl group, M represents La or Y, $R^2$ represents benzyl, $R^4$ represents THF, or $P(O)(Ph)_3$, and $R^{13}$ represents $N[SiH(Me)_2]_2$.

Scheme II depicts the synthesis of compounds of Formula I, wherein $R^{1a}$, $R^{1b}$, $R^{1c}$, and $R^{1d}$ independently at each occurrence is t-butyl; $R^2$ is benzyl; $R^3$ is $N(SiHMe_2)_2$; $R^4$ independently at each occurrence is selected from THF, and $P(O)(Ph)_3$; and M represents a rare earth element selected from lanthanum (La) and yttrium (Y).

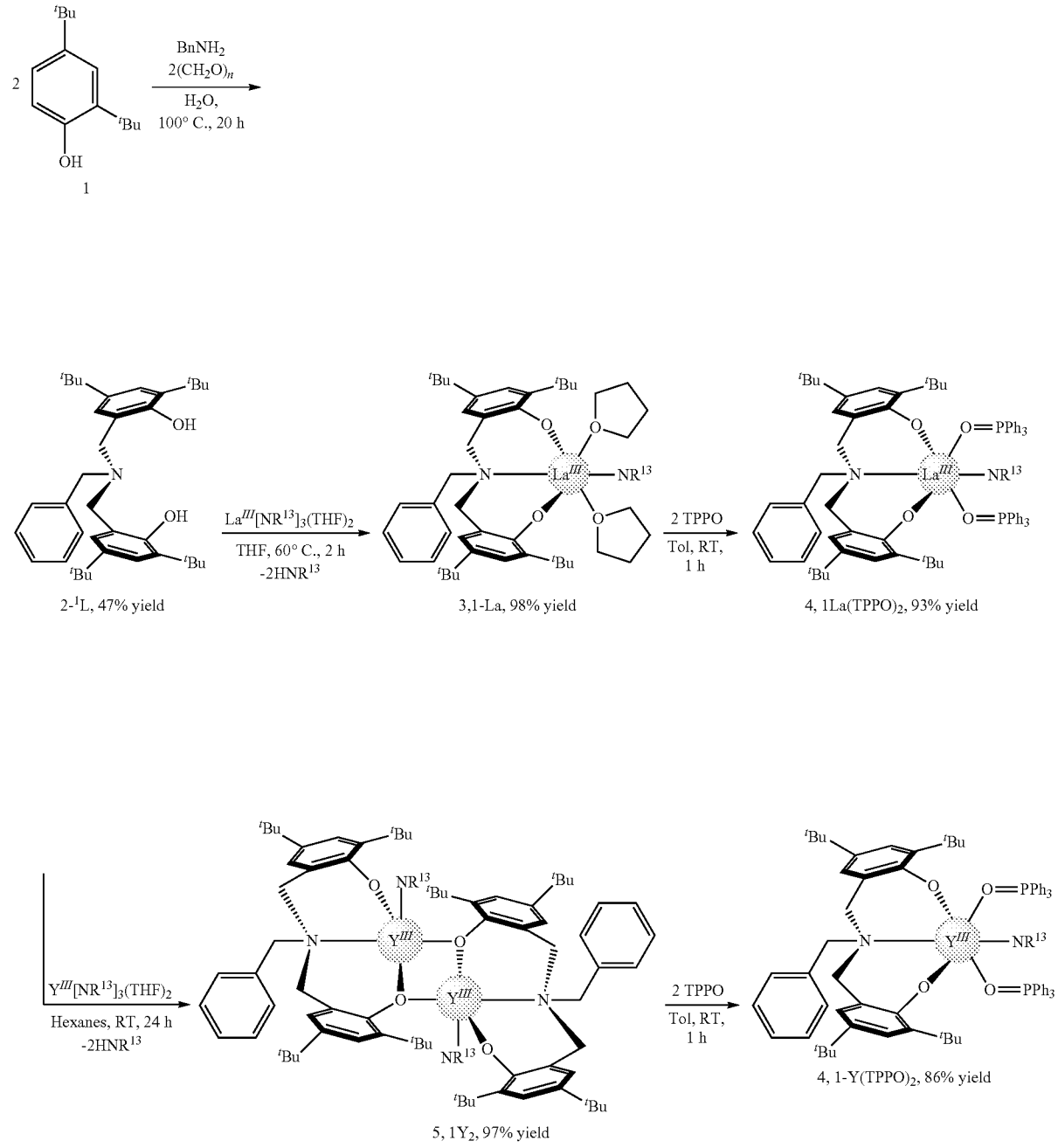

Synthesis of Compound 2: 6,6'-((benzylazanediyl)bis(methylene))bis(2,4-di-tert-butylphenol), Bn(ONO)H$_2$ ($^1$L)

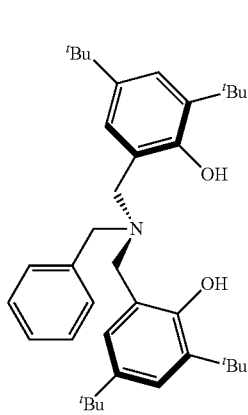

$^1$L

A 250 mL round-bottomed flask was charged with benzyl amine ((R$^2$)$_2$—NH$_2$) (3.27 g, 30.5 mmol, 1.0 equiv; MW: 107.16 g·mol$^{-1}$), DI water (50 mL), a Teflon-coated stir bar, and paraformaldehyde (1.83 g; 30.5 mmol; 2.0 equiv; MW: 30.03 g·mol$^{-1}$) paraformaldehyde, resulting in a colorless solution. To the stirring mixture, 2,6-ditertbutyl phenol (12.59 g, 30.5 mmol, 2.0 equiv; MW: 206.33 g·mol$^{-1}$) was added and floated on the top of the solution. The reaction was heated in an oil bath at 110° C. for 20 h. The mixture became a yellow emulsion during heating. After cooling to RT, a solid was formed out of the cooled liquid. The aqueous layer was decanted. The residual solid was dissolved in EtOH (20 mL) at 60° C. and then cooled to RT, affording a colorless crystalline solid after standing overnight. The solid was isolated by vacuum filtration over a course porosity fritted filter, washed with EtOH (2×10 mL), and dried under reduced pressure to furnish compound 2 ($^1$L) as a white solid. Yield: 7.8 g (14.3 mmol, 47% yield; MW: 543.84 g·mol$^{-1}$).

FIG. 1 shows the actual $^1$H NMR (CDCl$_3$, 400 MHz) for Compound 2 ($^1$L). Details of the spectra in FIG. 1 are:

$^1$H-NMR (400 MHz, CDCl$_3$, 298 K): δ=1.28 (s, 18H; 2-$^t$Bu), 1.42 (s, 18H; 4-$^t$Bu), 3.60 (s, 2H; NC$\underline{H}_2$Bn), 3.66 (s, 4H; NC$\underline{H}_2$ArOH), 6.94 (d, J=2.4 Hz, 2H; 5-H$_{Ar}$), 7.22 (d, J=2.4 Hz, 2H; 3-H$_{Ar}$), 7.30-7.42 ppm (m, 7H; Bn, OH).

Figure 2:
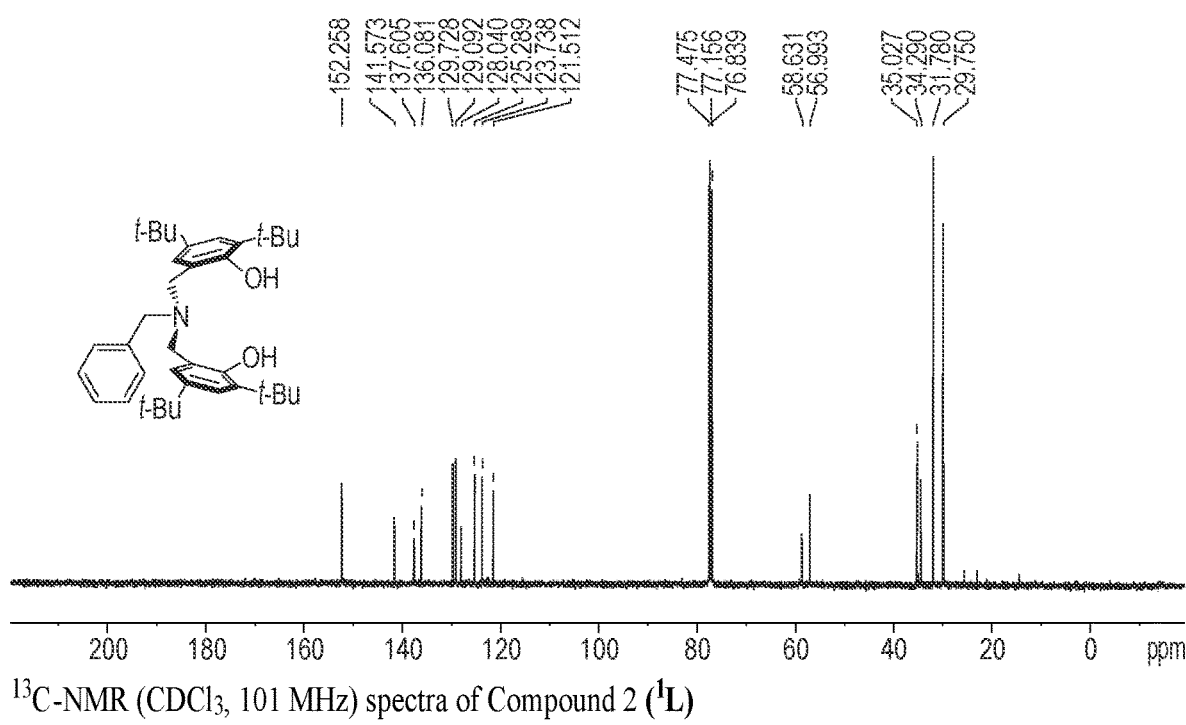
FIG. 2: $^{13}$C-NMR (CDCl$_3$, 101 MHz) spectra of Compound 2 ($^1$L)

FIG. 2 shows the actual $^{13}$C-NMR (CDCl$_3$, 101 MHz) spectra of Compound 2 ($^1$L). Details of the spectra in FIG. 2 are:

$^{13}$C{$^1$H}-NMR (101 MHz, CDCl$_3$, 298 K): δ=29.8 (C$\underline{M}$e$_3$), 31.8 (C$\underline{M}$e$_3$), 34.3 (C$\underline{M}$e$_3$), 35.0 (C$\underline{M}$e$_3$), 57.0 (NC$\underline{H}_2$ArOH), 58.6 (NC$\underline{H}_2$Bn), 121.5, 123.7, 125.3, 128.0, 129.1, 129.7, 136.1, 137.6, 141.6, 152.3 ppm (C$_{Ar}$—OH).

Figure 3:
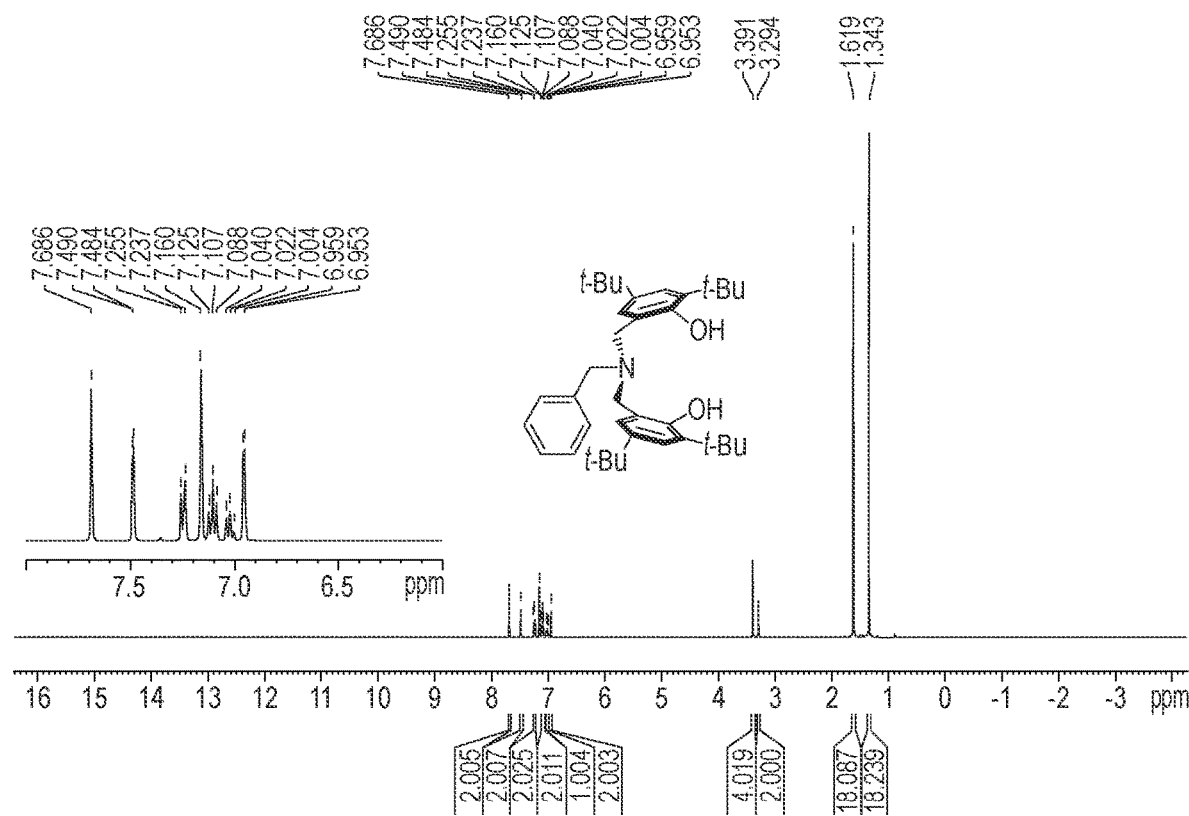
FIG. 3: $^1$H-NMR (C$_6$D$_6$, 400 MHz) spectra of compound 2 ($^1$L)

FIG. 3 shows $^1$H-NMR (C$_6$D$_6$, 400 MHz) spectra of Compound 2 ($^1$L). Details of the spectra in FIG. 3 are:

$^1$H-NMR (400 MHz, C$_6$D$_6$, 298 K): δ=1.34 (s, 18H; 2-$^t$Bu), 1.62 (s, 18H; 4-$^t$Bu), 3.29 (s, 2H; NC$\underline{H}_2$Bn), 3.39 (s, 4H; NC$\underline{H}_2$ArOH), 6.96 (d, J=2.4 Hz, 2H; 5-H$_{Ar}$), 7.02 (t, J=7.2 Hz, 1H; p-H$_{Bn}$), 7.11 (t, J=7.2 Hz, 2H; m-H$_{Bn}$), 7.26 (d, J=7.2 Hz, 2H; o-H$_{Bn}$), 7.49 (d, J=2.4 Hz, 2H; 3-H$_{Ar}$), 7.69 ppm (m, 2H; OH).

Elemental Analysis calcd. (%) for C$_{37}$H$_{53}$NO$_2$: C 81.72, H 9.82, N 2.58; found: C 81.94, H 9.78, N 2.56.

Synthesis of Compound 3: {La[Bn(ONO)][N(SiHMe$_2$)$_2$](THF)$_2$}(1-La)

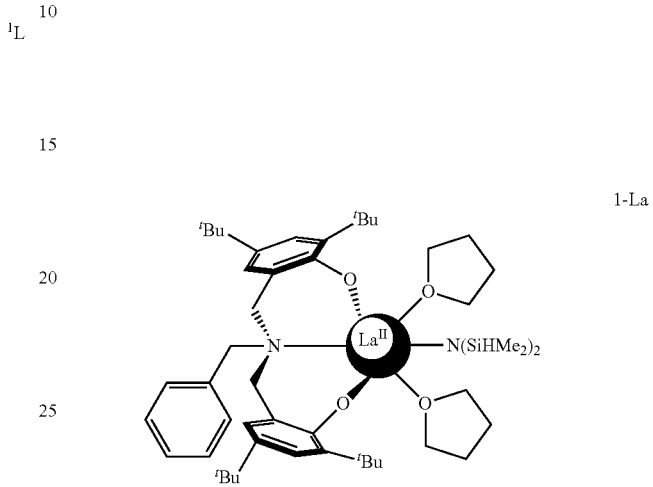

1-La

A 20 mL scintillation vial was charged with compound 2 ($^1$L) (335 mg, 0.62 mmol, 1.0 equiv; MW: 543.84 g·mol$^{-1}$), a Teflon-coated stir-bar, and THF (2 mL). To the stirring, clear, and colorless solution, La[N(SiHMe$_2$)$_2$]$_3$(THF)$_2$ (LaIII[NR$^{13}$]$_3$(THF)$_2$) (419 mg, 0.62 mmol, 1.0 equiv; MW: 680.12 g·mol$^{-1}$) was added. The solution was heated at 60° C. for 2 h. All volatiles were removed under reduced pressure, affording compound 3 (1-La) as a white solid. Yield: 580 mg (0.61 mmol, 98% yield; MW: 957.27 g·mol$^{-1}$).

Figure 4:
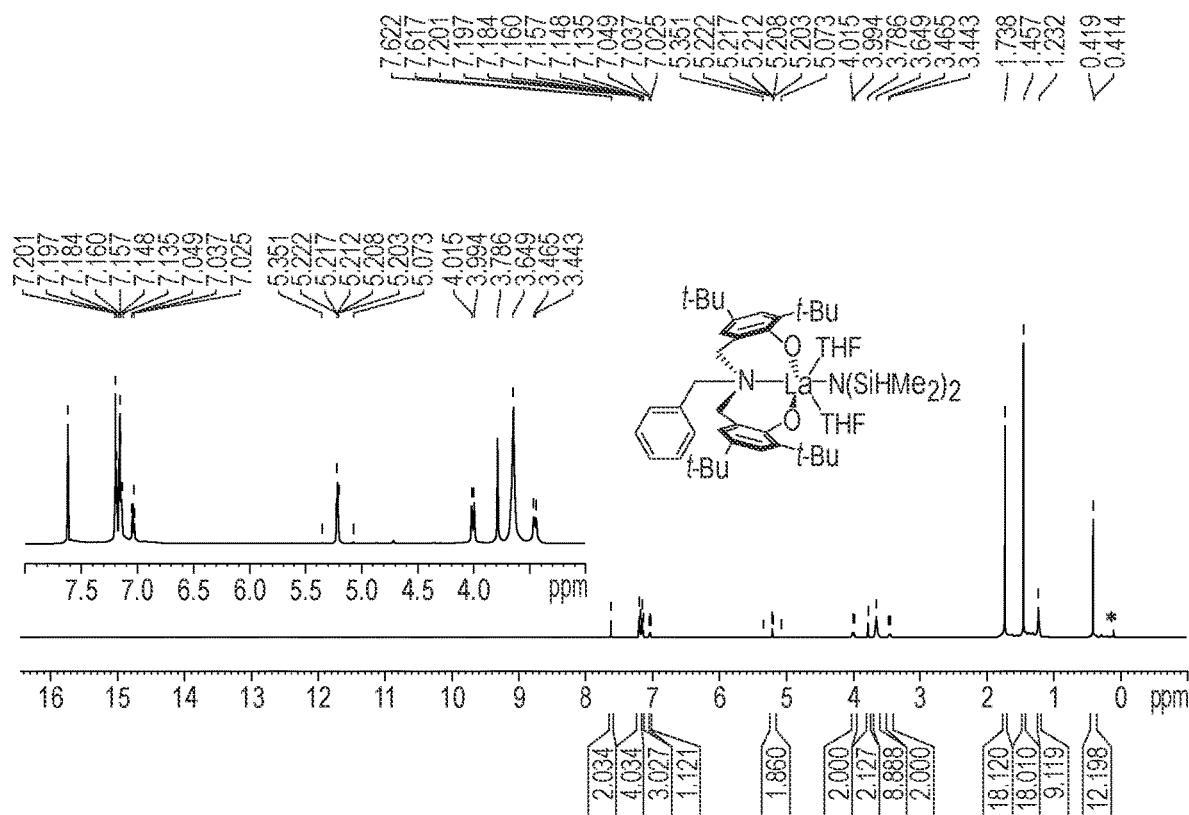
FIG. 4: $^1$H-NMR (C$_6$D$_6$, 600 MHz) spectra of compound 3 (1-La)

FIG. 4 shows $^1$H-NMR (C$_6$D$_6$, 600 MHz) spectra of compound 3 (1-La). Details of the spectra in FIG. 4 are:

$^1$H-NMR (600 MHz, C$_6$D$_6$, 298 K): δ=0.42 (d, $^3$J=3.0 Hz, 12H; SiH$\underline{M}$e$_2$), 1.23 (s, 8H; 3,4-H$_{THF}$), 1.46 (s, 18H; 2-$^t$Bu), 1.74 (s, 18H; 4-$^t$Bu), 3.45 (d, $^2$J=12.8 Hz, 2H; NC$\underline{H}_2$ArO), 3.65 (s, 8H; 2,5-H$_{THF}$), 3.79 (s, 2H; NC$\underline{H}_2$Bn), 4.00 (d, $^2$J=12.8 Hz, 2H; NC$\underline{H}_2$ArO), 5.21 (quint, $^3$J=3.0 Hz, $^1$J$_{Si(29)-H}$=167 Hz, 2H; Si—H), 7.04 (t, J=7.2 Hz, 1H; p-H$_{Bn}$), 7.15 (t, J=7.2 Hz, 2H; m-H$_{Bn}$), 7.19 (d, J=7.2 Hz, 2H; o-H$_{Bn}$), 7.20 (d, J=2.4 Hz, 2H; 5-HA.)), 7.62 ppm (d, J=2.4 Hz, 2H; 3-H$_{ArO}$).

Figure 5:
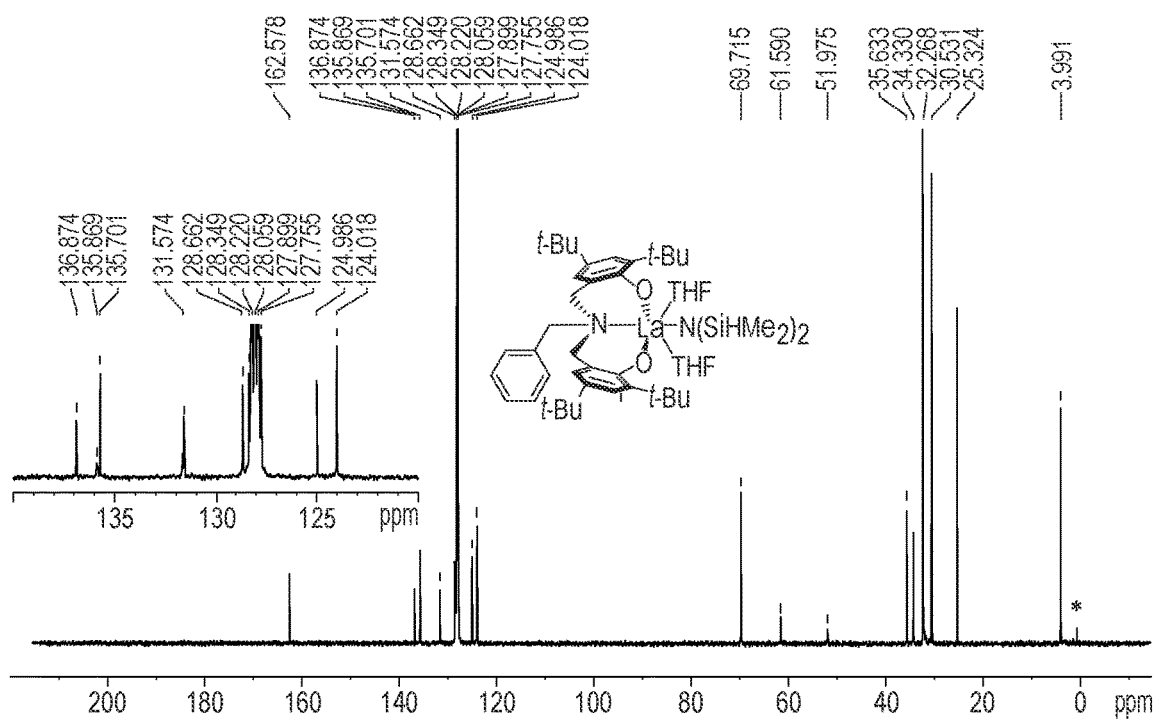
FIG. 5: $^{13}$C-NMR (C$_6$D$_6$, 152 MHz) spectra of compound 3 (1-La)

FIG. 5 shows $^{13}$C-NMR (C$_6$D$_6$, 152 MHz) spectra of compound 3 (1-La). Details of the spectra in FIG. 5 are:

$^{13}$C{$^1$H}-NMR (152 MHz, C$_6$D$_6$, 298 K): δ=4.0 (SiH$\underline{M}$e$_2$), 25.3 (3,4-C$_{THF}$), 30.5 (C$\underline{M}$e$_3$), 32.3 (C$\underline{M}$e$_3$), 34.3 (C$\underline{M}$e$_3$), 35.6 (C$\underline{M}$e$_3$), 52.0 (NC$\underline{H}_2$Bn), 61.6 (NC$\underline{H}_2$ArO), 69.7 (2,5-C$_{THF}$), 124.0, 125.0, 127.8, 128.3, 128.7, 131.6, 135.7, 135.9, 136.9, 162.6 ppm (C$_{Ar}$—O).

Elemental Analysis calcd. (%) for C$_{49}$H$_{81}$LaN$_2$O$_4$Si$_2$: C 61.75, H 8.30, N 2.92; found: C 61.48, H 8.53, N 2.93.

Synthesis of Compound 5: [Bn(ONO)Y—N(SiHMe$_2$)$_2$]$_2$ (1-Y$_2$)

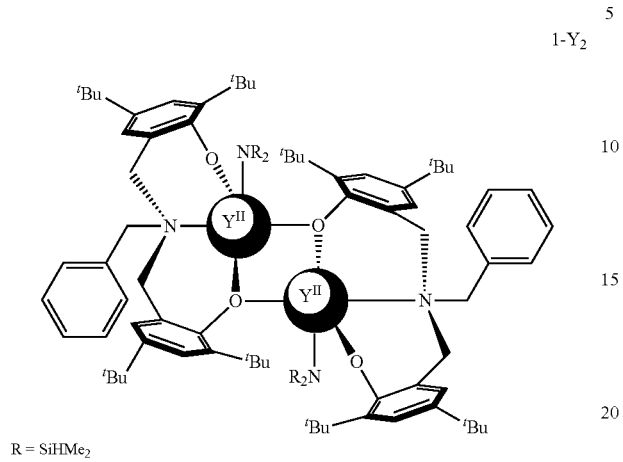

R = SiHMe$_2$

A 20 mL scintillation vial was charged with compound 2 ($^1$L) (253 mg, 0.47 mmol, 1.0 equiv; MW: 543.84 g·mol$^{-1}$), a Teflon-coated stir-bar, and hexanes (2 mL). To the stirring, clear, and colorless solution, Y[N(SiHMe$_2$)$_2$]$_3$(THF)$_2$ (YIII [NR$^{13}$]$_3$(THF)$_2$) (294 mg, 0.47 mmol, 1.0 equiv; MW: 630.12 g·mol$^{-1}$) was added. The solution was stirred at ambient temperature for 24 h. All volatiles were removed under reduced pressure, affording a dimer of a compound of Formula, compound 5 (1-Y$_2$) as a white solid. Yield: 345 mg (0.23 mmol, 97% yield; MW: 1526.12 g·mol$^{-1}$).

$^1$H-NMR (600 MHz, C$_6$D$_6$, 298 K): δ=−0.09 (d, $^3$J=2.9 Hz, 12H; SiHMe$_2$), 0.18 (d, $^3$J=2.9 Hz, 12H; SiHMe$_2$), 1.23 (s, 18H; 2-$^t$Bu), 1.32 (s, 18H; 4-$^t$Bu), 1.37 (s, 18H; 4-$^t$Bu), 1.62 (s, 18H; 2-$^t$Bu), 3.79 (d, $^2$J=13.2 Hz, 2H; NCH$_2$ArO), 3.93 (d, $^2$J=14.4 Hz, 2H; NCH$_2$ArO), 4.40 (d, $^2$J=14.4 Hz, 2H; NCH$_2$Bn), 4.55 (d, $^2$J=14.4 Hz, 2H; NCH$_2$Bn), 4.73 (d, $^2$J=13.2 Hz, 2H; NCH$_2$ArO), 4.94 (d, $^2$J=14.4 Hz, 2H; NCH$_2$ArO), 5.00-5.03 (m, 4H; Si—H), 7.06 (d, J=2.4 Hz, 2H; 5-H$_{ArO}$), 7.17 (t, J=7.2 Hz, 2H; p-H$_{Bn}$), 7.22 (d, J=2.4 Hz, 2H; 5-H$_{ArO}$), 7.27 (t, J=7.2 Hz, 4H; m-H$_{Bn}$), 7.38 (d, J=2.4 Hz, 4H; 3-H$_{ArO}$), 7.47 (d, J=2.4 Hz, 4H; 3-H$_{ArO}$), 7.60 ppm (d, J=7.2 Hz, 4H; o-H$_{Bn}$).

$^{13}$C{$^1$H}-NMR (152 MHz, C$_6$D$_6$, 298 K): δ=2.6 (SiHMe$_2$), 3.1 (SiHMe$_2$), 29.6 (CMe$_3$), 31.6 (CMe$_3$), 32.0 (CMe$_3$), 34.22 (CMe$_3$), 34.26 (CMe$_3$), 34.33 (CMe$_3$), 35.1 (CMe$_3$), 36.7 (CMe$_3$), 52.1 (NCH$_2$Bn), 59.3 (NCH$_2$ArO), 62.1 (NCH$_2$ArO), 123.3, 123.8, 125.5, 126.7, 128.29, 128.31, 128.34, 129.4, 132.8, 133.4, 136.4, 137.7, 137.9, 142.6, 155.0 (C$_{Ar}$—O), 161.1 ppm (d, J$_{Y-C}$=3.3 Hz, C$_{Ar}$—O).

Elemental Analysis calcd. (%) for C$_{82}$H$_{130}$N$_4$O$_4$Si$_4$Y$_2$: C 64.76, H 8.63, N 3.63; found: C 64.54, H 8.59, N 3.67.

The assignment of the $^1$H- and $^{13}$C{$^1$H}-NMR spectrum for 1-Y$_2$ was made by heteronuclear multiple bond correlation (HMBC) spectroscopy. Assignment for the bridging versus terminal phenolate in the $^{13}$C-NMR was made based on comparison of the mononuclear 1-La. The bridging phenolate C$_{Ar}$—O is significantly shifted up-field (155.0 ppm) in comparison to the corresponding terminal C$_{Ar}$—O (1-Y$_2$: 161.1 ppm; 1-La: 162.6 ppm). The HMBS experiment was done at 600 MHz, with filtered $^1$J coupling constant (cnst2)=145 Hz, long range $^n$J coupling constant (cnst13)=10 Hz.

Synthesis of Compound 4: Bn(ONO)La—N(SiHMe$_2$)$_2$—(OPPh$_3$)$_2$ (1-La(TPPO)$_2$)

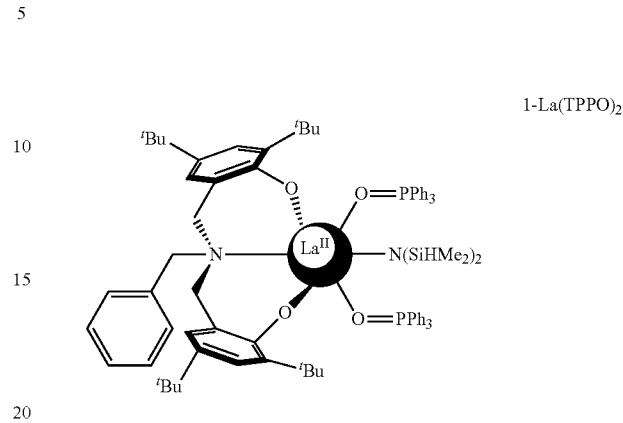

A 20 mL scintillation vial was charged with the compound of Formula I, compound 3 (1-La) (173 mg, 0.18 mmol, 1.0 equiv; MW: 957.27 g·mol$^{-1}$), OPPh$_3$ (101 mg, 0.36 mmol, 2.0 equiv; MW: 278.29 g·mol$^{-1}$) and toluene (0.5 mL). After all solids were dissolved, hexane (3 mL) was layered on top of the toluene solution. After the two layers mixed (~1 h), the vial was cooled in the glovebox freezer at −35° C. for 3 h, affording a white crystalline solid. The mother liquor was decanted and volatiles were removed under reduced pressure, affording compound 4 (1-La(TPPO)$_2$) as a white solid. Yield: 230 mg (0.17 mmol, 93% yield; MW: 1369.64 g·mol$^{-1}$). X-ray quality crystals were grown by layering hexane (2 mL) on top of a solution of 1-La(TPPO)$_2$ (200 mg/0.5 mL toluene) and allowing the solution to stand and mix undisturbed at RT.

Figure 6:
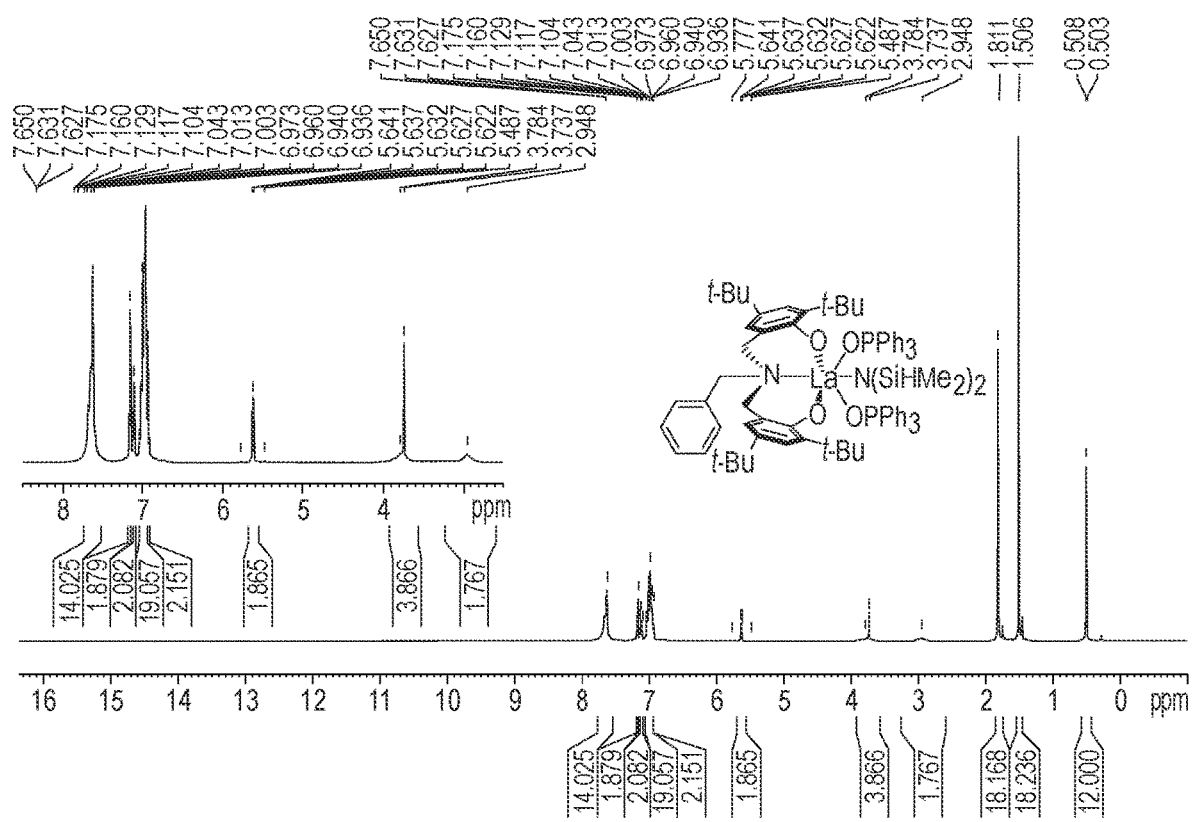
FIG. 6: $^1$H-NMR (C$_6$D$_6$, 600 MHz) spectra of 1-La (TPPO)$_2$

FIG. 6 shows the actual $^1$H-NMR (C$_6$D$_6$, 600 MHz) spectra of 1-La(TPPO)$_2$. Details of the spectra in FIG. 6 are:

$^1$H-NMR (600 MHz, C$_6$D$_6$, 298 K): δ=0.50 (d, J$_3$=3.0 Hz, 12H; SiHMe$_2$), 1.51 (s, 18H; 2$^t$Bu), 1.81 (s, 18H; 4-$^t$Bu), 2.95 (br, 2H; NCH$_2$ArO), 3.74 (s, 2H; NCH$_2$Bn), 3.78 (br, 2H; NCH$_2$ArO), 5.63 (quint, $^3$J=3.0 Hz, $^1$J$_{Si(29)-H}$=174 Hz, 2H; Si—H), 6.94 (d, J=2.4 Hz, 2H; 5-H$_{ArO}$)), 6.96-7.04 (m, 19H; p-H$_{Bn}$, m,p-H$_{OPPh3}$), 7.12 (t, J=7.5 Hz, 2H; m-H$_{Bn}$), 7.19 (d, J=7.5 Hz, 2H; o-H$_{Bn}$), 7.63 (d, J=2.4 Hz, 2H; 3-H$_{ArO}$), 7.65 ppm (br, 12H; o-H$_{OPPh3}$).

Figure 7:
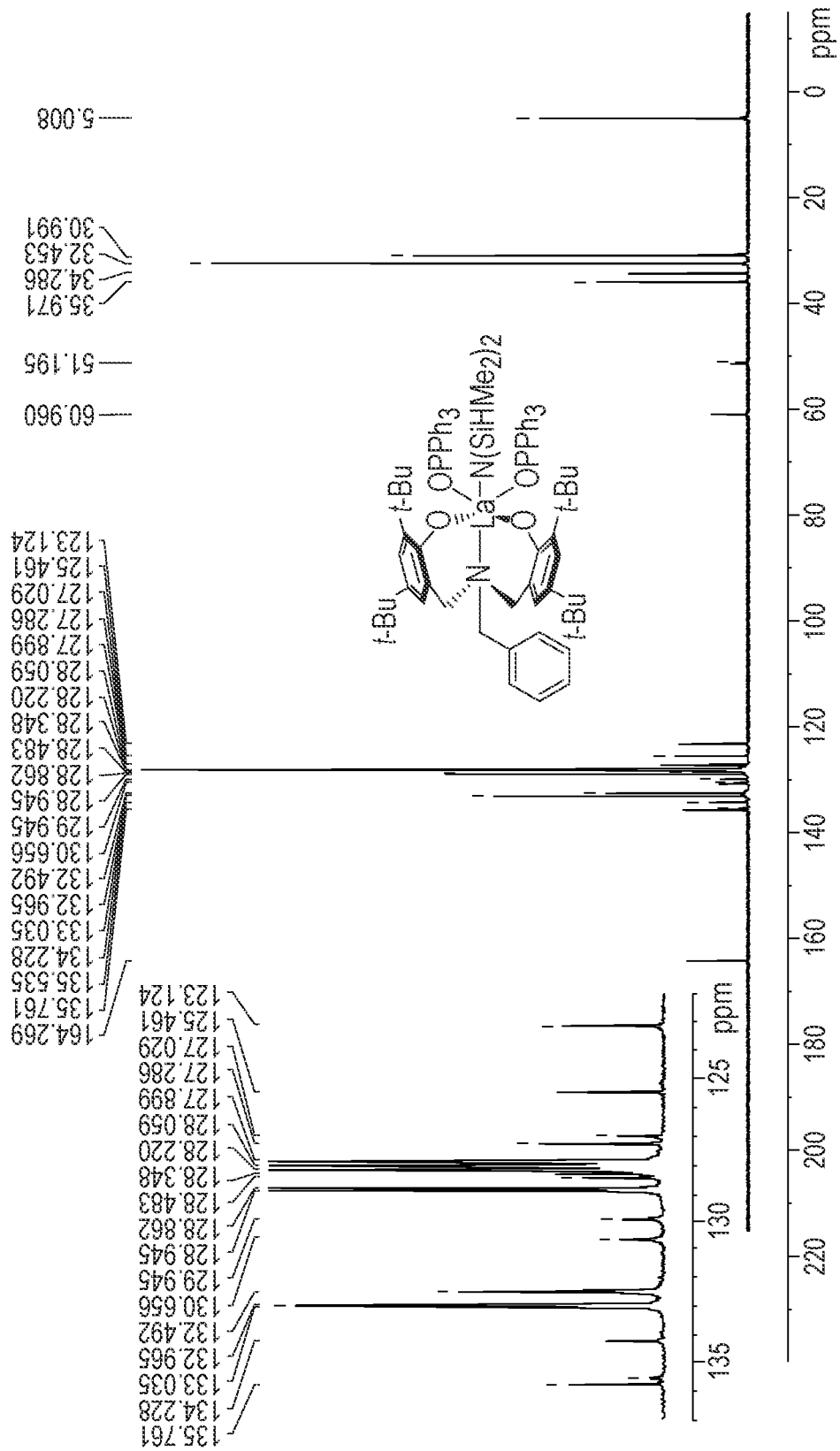
FIG. 7: $^{13}$C-NMR (C$_6$D$_6$, 152 MHz) spectra of 1-La (TPPO)$_2$

FIG. 7 shows the actual $^{13}$C-NMR (C$_6$D$_6$, 152 MHz) spectra of 1-La(TPPO)$_2$. Details of the spectra in FIG. 7 are:

$^{13}$C{$^1$H}-NMR (152 MHz, C$_6$D$_6$, 298 K): δ=5.0 (SiHMe$_2$), 31.0 (CMe$_3$), 32.5 (CMe$_3$), 34.3 (CMe$_3$), 36.0 (CMe$_3$), 51.2 (NCH$_2$Bn), 61.0 (NCH$_2$ArO), 123.1, 125.5, 127.0, 127.3, 128.3, 128.5, 128.9 (d, J$_{P(31)-C(13)}$=12.5 Hz; m-C$_{OPPh3}$), 130.3 (d, J$_{P(31)-C(13)}$=107 Hz; C—P), 132.5 (p-C$_{OPPh3}$), 133.0 (d, J$_{P(31)-C(13)}$=10.5 Hz; o-C$_{OPPh3}$), 134.2, 135.5, 135.8, 164.3 ppm (C$_{Ar}$—O).

Figure 8:
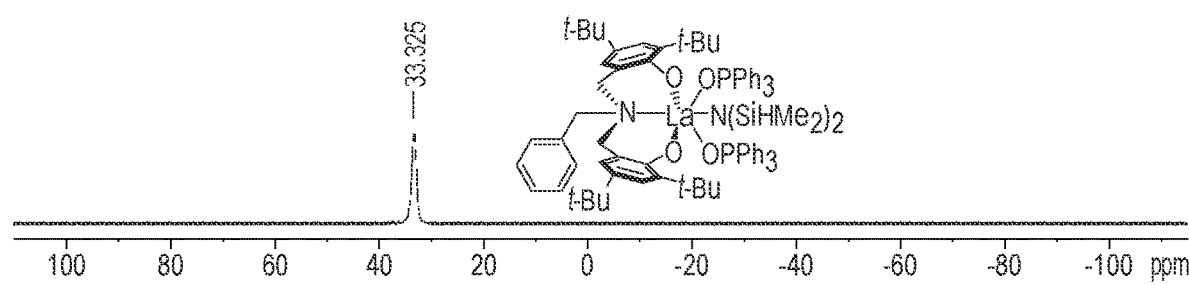
FIG. 8: $^{31}$P-NMR (C$_6$D$_6$, 243 MHz) spectra of 1-La (TPPO)$_2$

FIG. 8 shows the actual $^{31}$P-NMR (C$_6$D$_6$, 243 MHz) spectra of 1-La(TPPO)$_2$. Details of the spectra in FIG. 8 are:

$^{31}$P{$^1$H}-NMR (243 MHz, C$_6$D$_6$, 298 K): δ=33.3 ppm.

Elemental Analysis calcd. (%) for C$_{77}$H$_{95}$LaN$_2$O$_4$P$_2$Si$_2$: C 66.98, H 6.77, N 1.86; found: C 67.52, H 6.99, N 2.05.

Synthesis of Compound 4: Bn(ONO)Y—N(SiHMe$_2$)$_2$—(OPPh$_3$)$_2$ (1-Y(TPPO)$_2$)

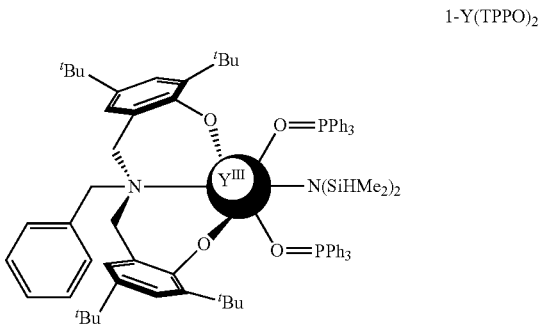

1-Y(TPPO)$_2$

A 20 mL scintillation vial was charged with the dimer of the compound of Formula I, compound 5 1-Y$_2$ (129 mg, 0.085 mmol, 1.0 equiv; MW: 1526.12 g·mol$^{-1}$), OPPh$_3$ (94 mg, 0.34 mmol, 4.0 equiv; MW: 278.29 g·mol$^{-1}$) and toluene (0.5 mL). After all solids were dissolved, hexane (3 mL) was layered on top of the toluene solution. After the two layers mixed (~1 h), the vial was cooled in the glovebox freezer at −35° C. for 3 h, affording a white crystalline solid. The mother liquor was decanted, and volatiles were removed under reduced pressure, affording 1-Y(TPPO)$_2$ as a white solid. Yield: 192 mg (0.15 mmol, 86% yield; MW: 1319.64 g·mol$^{-1}$). X-ray quality crystals were grown by layering hexanes (1 mL) on top of a solution of 1-Y(TPPO)$_2$ (100 mg/0.2 mL toluene) and allowing the solution to stand and mix undisturbed at RT.

Note: Crystalized 1-Y(TPPO)$_2$ has limited solubility in C$_6$D$_6$, and upon dissolution, dissociation of OPPh$_3$ was observed by $^1$H- and $^{31}$P-NMR. Dimeric and monomeric states were observed at low concentration ([Y]=25 mM). Concentrated ([Y]=75 mM) C$_6$D$_6$ solution of 1-Y(TPPO)$_2$ was made by adding 4 equiv. OPPh$_3$ to C$_6$D$_6$ solution of 1-Y$_2$, in which only a dimeric state was observed.

Figure 9:
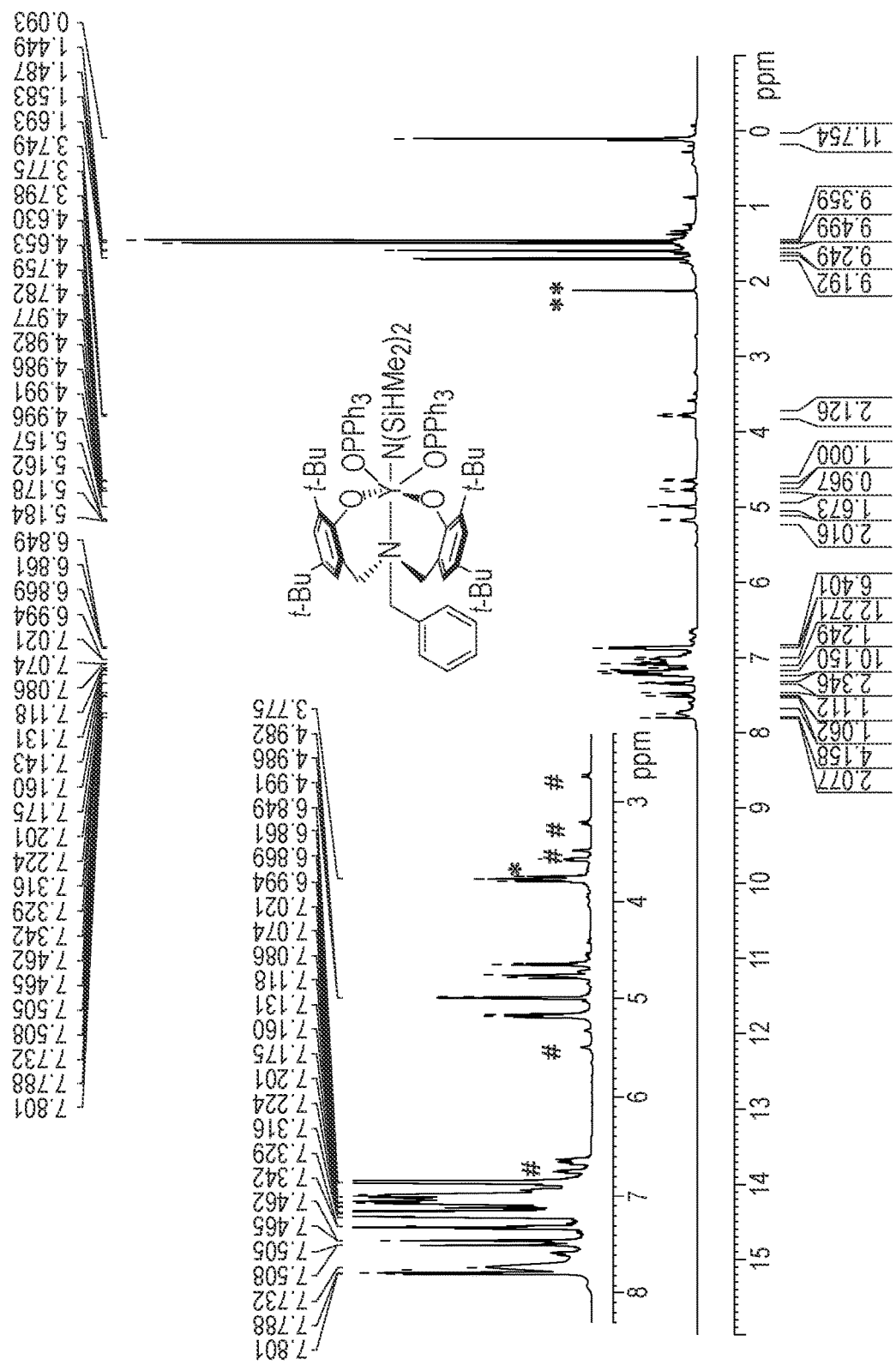
FIG. 9: $^1$H-NMR (C$_6$D$_6$, 600 MHz) spectra of 1-Y (TPPO)$_2$. (*: THF; **: toluene; #: complex resulted from TPPO dissociation)

FIG. 9 shows the $^1$H-NMR (C$_6$D$_6$, 600 MHz) spectra of 1-Y(TPPO)$_2$. (*: THF; **: toluene; #: complex resulted from TPPO dissociation). Details of the spectra in FIG. 9 are:

$^1$H-NMR (600 MHz, C$_6$D$_6$, 298 K, 75 mM, in-situ prepared): δ=0.09 (d, $^3$J=3.0 Hz, 12H; SiHMe$_2$), 1.45 (s, 9H; $^t$Bu), 1.49 (s, 9H; $^t$Bu), 1.58 (s, 9H; $^t$Bu), 1.69 (s, 9H; $^t$Bu), 3.76 (d, J=15.3 Hz, 1H; NCH$_2$ArO), 3.78 (d, J=13.7 Hz, 1H; NCH$_2$ArO), 4.64 (d, J=14.1 Hz, 1H; NCH$_2$Bn), 4.77 (d, J=14.1 Hz, 1H; NCH$_2$Bn), 4.99 (quint, $^3$J=3.0 Hz, 2H; Si—H), 5.16 (d, J=15.3 Hz, 1H; NCH$_2$ArO), 5.17 (d, J=13.7 Hz, 1H; NCH$_2$ArO), 6.86 (t, J=6.0 Hz, 6H; p-H$_{OPPh3}$), 6.99-7.09 (m, 12H), 7.13 (t, J=7.5 Hz, 1H; p-H$_{Bn}$), 7.17-7.22 (m, 10H), 7.33 (t, J=7.5 Hz, 2H; m-H$_{Bn}$), 7.46 (d, J=2.4 Hz, 1H; 3-H$_{ArO}$), 7.50 (d, J=2.4 Hz, 1H; 3-H$_{ArO}$), 7.73 (br, 4H), 7.79 ppm (d, J=7.5 Hz, 2H; o-H$_{Bn}$).

Figure 10:
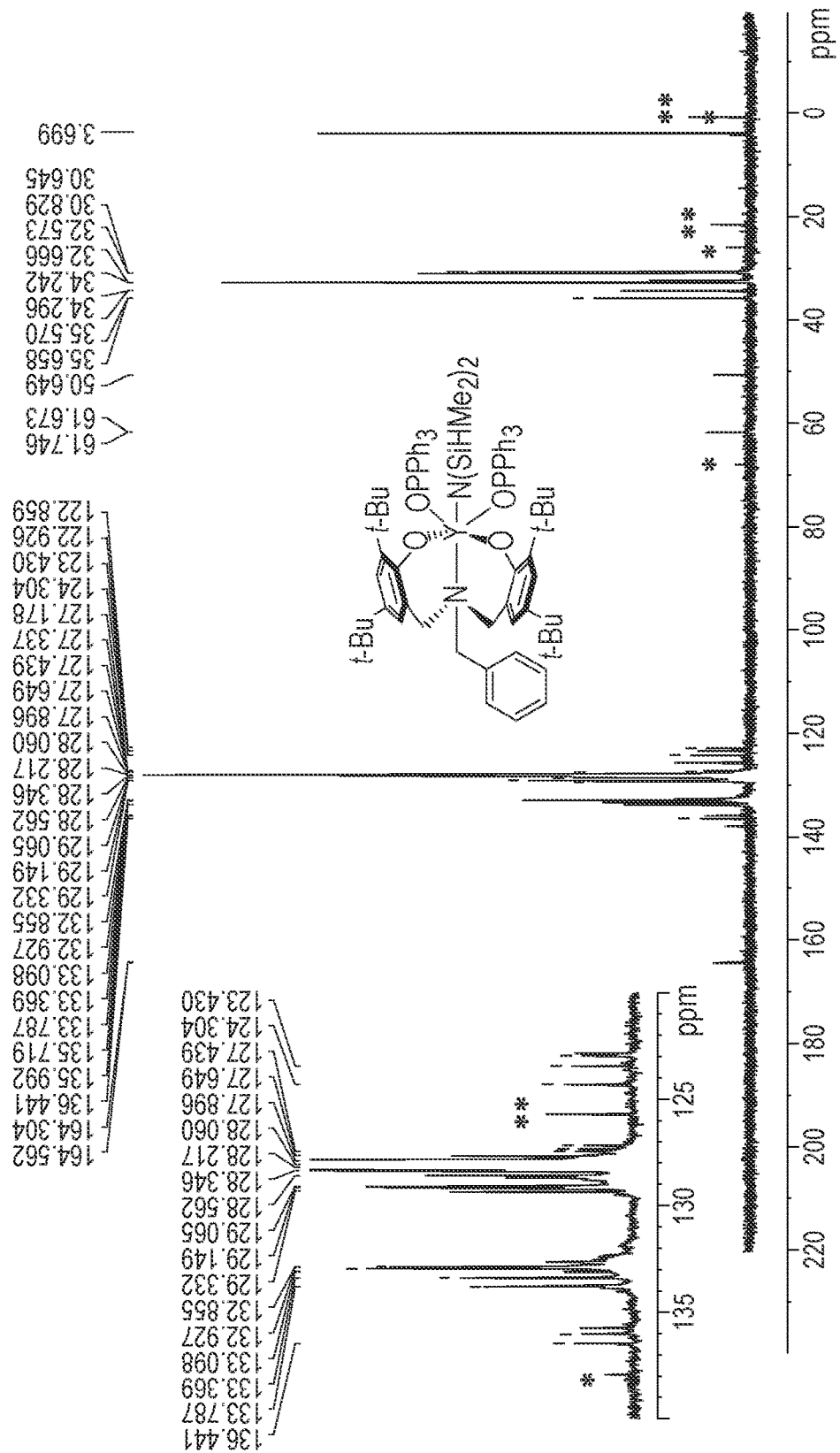
FIG. 10: $^{13}$C-NMR (C$_6$D$_6$, 152 MHz) spectra of 1-Y (TPPO)$_2$. (*: THF; : toluene; *: HN(SiHMe$_2$)$_2$)

FIG. 10 shows the $^{13}$C-NMR (C$_6$D$_6$, 152 MHz) spectra of 1-Y(TPPO)$_2$. (*: THF; : toluene; *: HN(SiHMe$_2$)$_2$). Details of the spectra in FIG. 10 are provided below:

$^{13}$C{$^1$H}-NMR (152 MHz, C$_6$D$_6$, 298 K, 75 mM, in-situ prepared): δ=3.7 (SiHMe$_2$), 30.6 (CMe$_3$), 30.8 (CMe$_3$), 32.6 (CMe$_3$), 32.7 (CMe$_3$), 34.2 (CMe$_3$), 34.3 (CMe$_3$), 35.6 (CMe$_3$), 35.7 (CMe$_3$), 50.6 (NCH$_2$Bn), 61.67 (NCH$_2$ArO), 61.7 (NCH$_2$ArO), 122.8, 122.9, 123.4, 124.3, 127.2, 127.3, 127.4, 127.6, 128.3 (p-C$_{OPPh3}$), 128.9 (d, J$_{P(31)-C(13)}$=115 Hz; P—C), 129.1 (d, J$_{P(31)-C(13)}$=12.6 Hz; m-C$_{OPPh3}$), 132.9 (d, J$_{P(31)-C(13)}$=10.9 Hz; o-C$_{OPPh3}$), 133.1, 133.4, 133.8, 135.7, 136.0, 136.4, 164.3 (O—C), 164.6 ppm (O—C).

Figure 11:
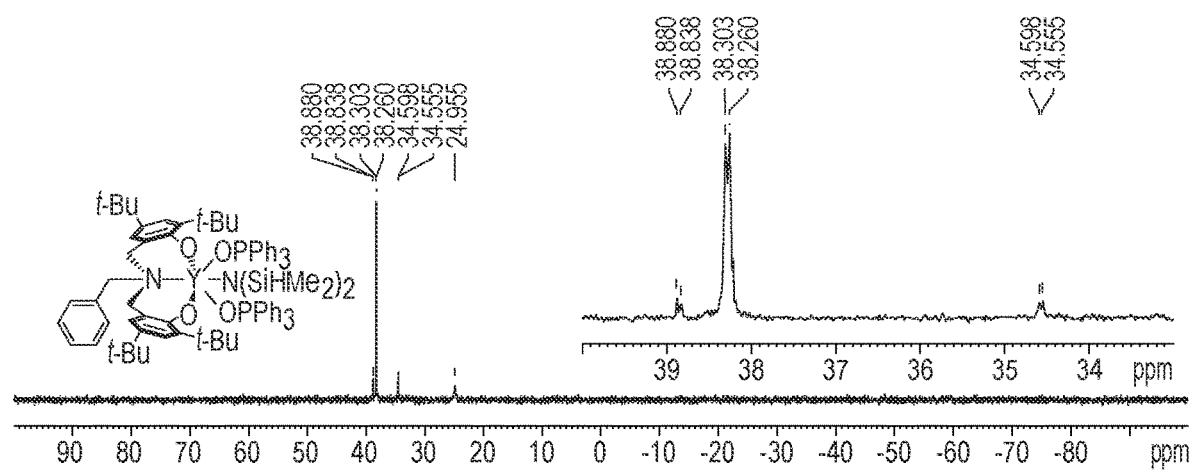
FIG. 11: $^{31}$P-NMR (C$_6$D$_6$, 243 MHz) spectra of 1-Y (TPPO)$_2$

FIG. 11 shows the $^{31}$P-NMR (C$_6$D$_6$, 243 MHz) spectra of 1-Y(TPPO)$_2$. Details of the spectra in FIG. 11 are discussed below:

$^{31}$P{$^1$H}-NMR (243 MHz, C$_6$D$_6$, 298 K, 75 mM, in-situ prepared): δ=25.0 (br, free TPPO), 34.6 (d, J$_{Y-P(31)}$=10.4 Hz; complex of TPPO dissociation), 38.3 (d, J$_{Y-P(31)}$=12.8 Hz; [1-Y(TPPO)$_2$]$_2$), 38.9 (d, J$_{Y-P(31)}$=10.3 Hz; complex of TPPO dissociation) ppm.

Elemental Analysis calcd. (%) for C$_{77}$H$_{95}$LaN$_2$O$_4$P$_2$Si$_2$: C 69.75, H 7.59, N 1.65; found: C 70.08, H 7.26, N 2.12.

Compound 4:

R$^{1a}$, R$^{1b}$, R$^{1c}$, and R$^{1d}$ independently represent t-butyl, Cumyl, or Cl; R$^3$ is selected from benzyl, methyl, H, or i-propyl; X represents OCH-Ph$_2$; and L is selected from TPPO and OMe-LO.

Compound 4 with the above formula can be synthesized by procedures outlined in the synthesis of other Compound 4 molecules outlined elsewhere in this document.

Stereospecific Synthesis of Aliphatic Esters of Formula X

A typical polymerization procedure/stereospecific synthesis of an aliphatic ester (Compound of Formula X) by ring opening polymerization of rac-BBL was accomplished as shown in Scheme III below:

Scheme III

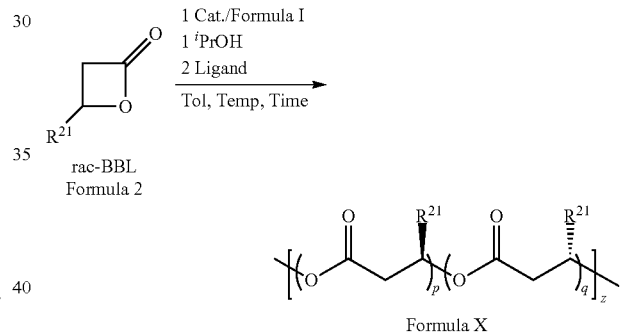

Reaction at Ambient Temperature:

The ring opening polymerization of rac-BBL was accomplished at ambient/room temperature. In a glovebox, a 2 mL scintillation vial was charged with 1-La(TPPO)$_2$ (Compound 4, Formula I) (8.2 mg, 0.0060 mmol, 1.0 equiv; MW: 1369.64 g·mol$^{-1}$) and toluene (0.382 mL). A toluene solution of $^i$PrOH (2% m/m, 0.021 mL, ρ=0.867 g/mL; 0.36 mg, 0.0060 mmol, 1.0 equiv; MW: 60.10 g·mol$^{-1}$) was then added to the clear colorless solution. After approximately one minute, rac-BBL (103 mg, 1.20 mmol, 200 equiv; MW: 86.09 g·mol$^{-1}$) was added to the catalyst solution. After 1 h, the reaction was quenched by a drop of acetic acid, and all volatiles were removed under reduced pressure.

Analysis of Reaction Progress Prior to Quenching:

The reaction progress was monitored prior to quenching the reaction mixture. An aliquot of the reaction mixture was removed and dissolved in CDCl$_3$ for 1H NMR analysis without additional quenching. The absence of a signal at around 4 ppm indicated absence of rac-BBL, and presence of a signal at around 5.25 ppm indicated the presence of the product of Formula X.

With the compounds 1-La and 1-Y$_2$ in hand, we evaluated their reactivity as catalysts for the stereospecific ROP of rac-BBL at RT (Table 1). Catalyst optimization studies were restricted to measurement of conversion at 1 h in an effort to identify active catalysts without tether groups. Some reactions were catalytic activity of a compound of Formula. As seen in example 1, there was no activity without the presence of i-propanol. carried out for longer than 1 hour to determine the $M_n$ values represent number average molecular weight. Theoretical $M_n$ values, or $M_{n,\ calc.}$, are calculated by concentration of rac-BBL divided by catalyst concentration divided by i-PrOH concentration. The ratio of rac-BBL to i-Propanol was 1:1; the column Conv % represents the reaction yield as determined from crude $^1$H-NMR (moles of product over the sum of moles monomer and polymer). Đ (dispersity) values represent weight-average molecular weight, $M_w$, over the number-average molecular weight, $M_n$. Đ represents the molecular weight distribution, which is $M_w/M_n$. The lowest theoretical value for Đ is 1, where values <1.1 will be referred to as very narrow molecular weight distributions, and values 1.1≤1.3 are referred to as narrow molecular weight distributions. Representative ROP of rac-BBL by 1-$Y_2$ and 1-La with amide initiating groups are shown in Table 1, entries 1 and 2, where 1-$Y_2$ is inactive and 1-La furnishes polymer with moderate molecular weight dispersity ($M_w/M_n$, Đ). Similar to other RE$^{III}$ amide initiators, in-situ generation of alkoxide initiators by adding one equiv $^i$PrOH to 1-$Y_2$ and 1-La and (entries 3 & 4) led to catalysts with increased conversion and narrow Đ (<1.1). Microstructural analysis of P3HB determined by integration of polymer C=O resonances by inverse-gated $^{13}$C-NMR revealed a slight isotactic preference for the stereospecific ROP using 1-La ($P_m$~0.57). While only a modest isotactic enrichment, this is the opposite tacticity preference observed for 2-Y and other amino-diphenolate catalysts with tethered donors. Given this result, we hypothesized that the different stereochemical preferences of these catalysts originate from the nature of the donor ligand (e.g. donor-identity and whether it is tethered).

Entries in Table I used monodentate neutral ligands along with 1-La and 1 equiv $^i$PrOH, and examples of monodentate neutral ligands use in this study were ethers (tetrahydrofuran, THF), tertiary amines (1,4-diazabicyclo-[2.2.2]octane, DABCO), pyridines (4-dimethylaminopyridine, DMAP), phosphines, (PPh$_3$), and phosphine oxides (OPPh$_3$, TPPO).

Figure 12:
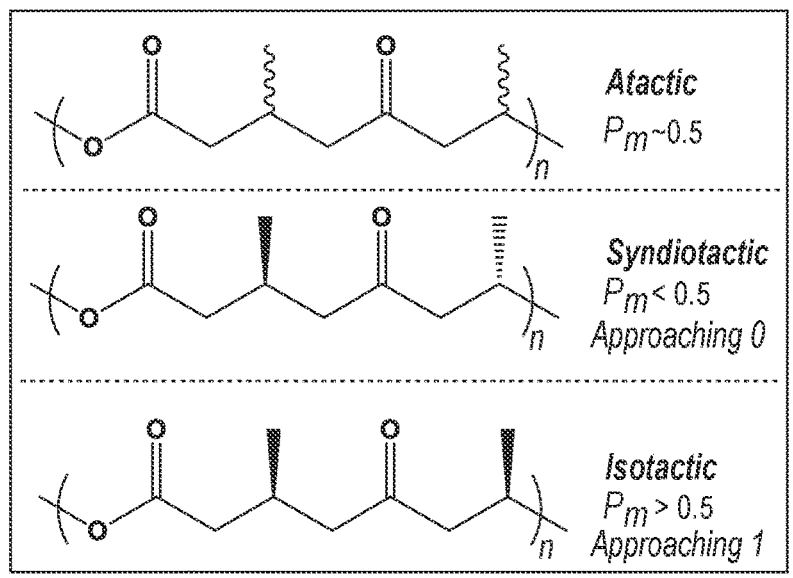
FIG. 12: Visual Representation of Atactic, syndiotactic, and isotactic P3HB and associated $P_m$ values
Figure 13:
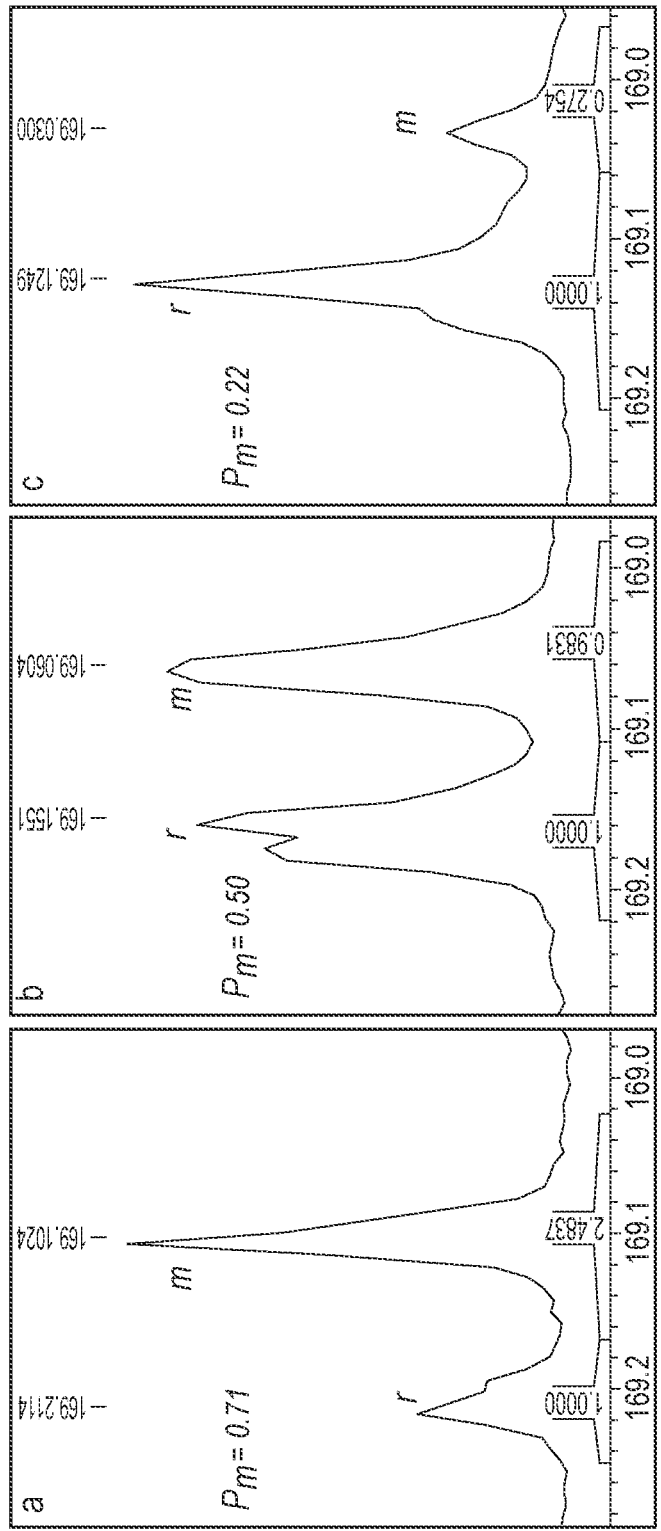
FIG. 13: Carbonyl region of IG-$^{13}$C-NMR (152 MHz, CDCl$_3$) of P3HB with different $P_m$ FIG. 14 MALDI-TOF spectrum of P3HB, produced in toluene at ambient temperature with [BBL]/[1-La]/[OPPh$_3$]/[i-PrOH]=40/1/2/1 and [BBL]=2.4 M within 1 h. Conversion=99%, M$_n$=3.8 kg/mol (corrected by Mark-Houwink factor of 0.54), Đ=1.15

Weaker neutral monodentate ligands (entries 5 7) had a minor impact on reactivity and polymer stereochemistry, where DABCO decelerated ROP (entry 6) and PPh$_3$ produced atactic P3HB (entry 7). $P_m$ values for P3HB near 0.5 represent random chain (methyl group) distribution (atactic), <0.5 (approaching 0) approach alternating chain distribution (syndiotactic), and 0.5>(approaching 1) approach chain distribution on the same side (isotactic). This is visually represented in FIG. 12. Representative inverse-gated $^{13}$C-NMR for isotactic, atactic, and syndiotactic P3HB is provided in FIG. 13. For reference, the previous limit for $P_m$ values obtained from the ROP of (rac)-BBL by a homogeneous catalyst was 0.77 (Cui, et. al.), while the record for any catalyst is 0.85 (Thomas, et. al.). In contrast, the harder phosphine oxide ligand, TPPO, dramatically increased conversion (78% within 1 h) and isotacticity ($P_m$=0.71, Table 1, entry 8). Varying equivalents of TPPO from 0-3 with respect to 1-La indicated that maximum gains in reactivity (% conversion) and selectivity ($P_m$) were reached with 2 equivalents (Table 1, entries 4, 8-10). Given this significant enhancement in catalyst performance, we evaluated the ROP of rac-BBL by 1-La and representative classes of substituted phosphine oxides (aromatic, aliphatic, phosphoramide, and phosphate; 2 equiv; entries 11-13). The weaker donor, triphenylphosphate (OP(OPh)$_3$, entry 11), did not accelerate catalysis with 1-La and only modestly increased isoselectivity ($P_m$~0.63). Electron-rich donors, such as hexamethylphosphoramide (HMPA, entry 12) and trioctylphosphine oxide (TOPO, entry 13) showed increased reactivity at RT and the highest levels of isoselectivity ($P_m$=0.73 and 0.75 respectively).

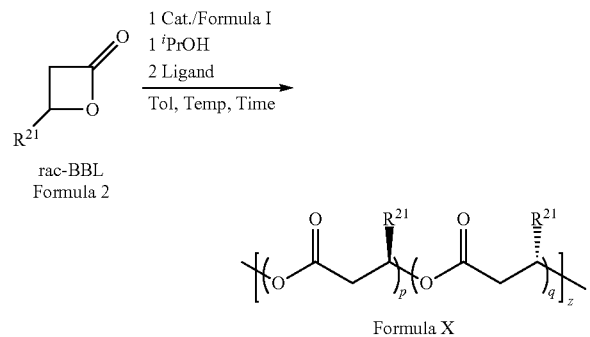

Scheme III

TABLE 1

Influence of external ligand on the stereospecific ROP of (rac)-BBL catalyzed by 1-RE

| Entry | Cat. | [BBL]/[Cat]/[iPrOH] | Ligand | Temp (°C.) | Time (h) | Conv. (%) [a] | $M_{n,\ calc}$ [b] (kg·mol$^{-1}$) | $M_{n,\ exp}$ [c] (kg·mol$^{-1}$) | Đ [c, d] | $P_m$ [e] |
|---|---|---|---|---|---|---|---|---|---|---|
| 1 | 1-$Y_2$ | 400/1/0 | — | 25 | 48 | 0 | — | n.d. | n.d. | n.d. |
| 2 | 1-La | 200/1/0 | — | 25 | 48 | 35 | 5.9 | 2.1 | 1.46 | 0.54 |
| 3 | 1-$Y_2$ | 400/1/1 | — | 25 | 1 | 7 | 1.2 | n.d. | n.d. | n.d. |
| 4 | 1-La | 200/1/1 | — | 25 | 1 | 21 | 3.6 | 2.9 | 1.04 | 0.57 |
| 5 | 1-La | 200/1/1 | DMAP | 25 | 1 | 22 | 3.8 | 3.6 | 1.07 | 0.59 |
| 6 | 1-La | 200/1/1 | DABCO | 25 | 1 | 7 | 1.2 | n.d. | n.d. | n.d. |
| 7 | 1-La | 200/1/1 | PPh$_3$ | 25 | 1 | 22 | 3.8 | 2.8 | 1.05 | 0.51 |
| 8 | 1-La | 200/1/1 | TPPO | 25 | 1 | 97 | 16.7 | 12.3 | 1.05 | 0.71 |
| 9 | 1-La | 200/1/1 | TPPO[f] | 25 | 6 | 71 | 12.2 | 4.7 | 1.04 | 0.67 |
| 10 | 1-La | 200/1/1 | TPPO[g] | 25 | 1 | 98 | 16.8 | 9.1 | 1.27 | 0.71 |
| 11 | 1-La | 200/1/1 | OP(OPh)$_3$ | 25 | 1 | 37 | 6.4 | 3.3 | 1.32 | 0.63 |
| 12 | 1-La | 200/1/1 | HMPA | 25 | 1 | 99 | 17.0 | 9.4 | 1.29 | 0.73 |
| 13 | 1-La | 200/1/1 | TOPO | 25 | 1 | 99 | 17.0 | 9.5 | 1.23 | 0.75 |
| 14 | 1-La | 200/1/2 | TPPO | 25 | 1 | 85 | 7.3 | 5.9 | 1.14 | n.d. |
| 15 | 1-La | 200/1/4 | TPPO | 25 | 1 | 93 | 4.0 | 3.3 | 1.07 | 0.70 |

TABLE 1-continued

Influence of external ligand on the stereospecific ROP of (rac)-BBL catalyzed by 1-RE

| Entry | Cat. | [BBL]/[Cat]/[iPrOH] | Ligand | Temp (° C.) | Time (h) | Conv. (%) [a] | $M_{n, calc}$ [b] (kg · mol$^{-1}$) | $M_{n, exp}$ [c] (kg · mol$^{-1}$) | Đ [c, d] | $P_m$ [e] |
|---|---|---|---|---|---|---|---|---|---|---|
| 16 | 1-La | 400/0.5/1 [h] | TPPO | 25 | 12 | 55 | 37.9 | 12.0 | 1.54 | n.d. |
| 17 | 1-La | 200/1/1 | TPPO | 0 | 1 | 96 | 16.5 | 13.2 | 1.05 | 0.76 |
| 18 | 1-La | 400/1/1 | TPPO | 0 | 4 | 77 | 26.5 | 18.6 | 1.07 | 0.75 |
| 19 | 1-La | 200/1/1 | TPPO | −30 | 24 | 99 | 17.0 | 12.5 | 1.04 | 0.80 |
| 20 | 1-La | 200/1/1 | TOPO | 0 | 4 | 99 | 17.0 | 14.5 | 1.11 | 0.80 |
| 21 | 1-La | 400/1/1 | TOPO | 0 | 4 | 96 | 33.1 | 20.2 | 1.06 | 0.80 |
| 22 | 1-La | 200/1/1 | TOPO | −30 | 6 | 99 | 17.0 | 12.0 | 1.14 | 0.81 |
| 23 | 1-La | 100/1/1 [i] | TPPO | 25 | 1 | 97 | 16.7 | 9.6 | 1.18 | 0.72 |
| 24 | 1-La | 100/1/1 [i] | MeO-LO | 25 | 0.03 | 95 | 16.4 | 9.2 | 1.16 | 0.73 |
| 25 | 1-La[j] | 100/1/1 [i] | TPPO | 25 | 1 | 86 | 14.8 | 8.4 | 1.21 | 0.70 |
| 26 | 1-La[k] | 100/1/1 [i] | TPPO | 25 | 1 | 41 | 7.1 | 4.7 | 1.32 | 0.67 |
| 27 | 1-La[l] | 100/1/1 [i] | TPPO | 25 | 1 | 62 | 10.7 | 5.7 | 1.27 | 0.71 |
| 28 | 1-La[m] | 100/1/1 [i] | TPPO | 25 | 1 | 76 | 13.1 | 7.0 | 1.33 | 0.56 |
| 29 | 1-La[o] | 100/1/1 [i] | TPPO | 25 | 1 | 98 | 16.9 | 9.7 | 1.15 | 0.75 |

[a] Determined by $^1$H-NMR from integration of BBL and PHB methine resonances. Reaction times not optimized

[b] [BBL]/[Cat]/[$^i$PrOH] × Conv. × 0.08609 kg · mol$^{-1}$.

[c] Determined by gel permeation chromatography (GPC) at 30° C. in THF using polystyrene standards and corrected by Mark-Houwink factor of 0.54.

[d] $M_w/M_n$.

[e] Probability of meso-linkages between repeat units. Determined by integration of P3HB C=O resonances using inverse gated (IG) $^{13}$C-NMR.

[f] 1 equiv.

[g] 3 equiv.

[h] 1 equiv HO(CH$_2$)$_6$OH was used instead of $^i$PrOH.

[i] [rac-BBL] = 1.2M BBL, R$^3$ = OCHPh$_2$, solvent is C$_6$D$_6$

[j] Compound 4, where R$^{1a}$ = R$^{1b}$ = R$^{1c}$ = R$^{1d}$ = $^t$Bu, R$^2$ = Me.

[k] Compound 4, where R$^{1a}$ = R$^{1b}$ = R$^{1c}$ = R$^{1d}$ = $^t$Bu, R$^2$ = H.

[l] Compound 4, where R$^{1a}$ = R$^{1b}$ = R$^{1c}$ = R$^{1d}$ = $^t$Bu, R$^2$ = $^i$Pr.

[m] Compound 4, where R$^{1a}$ = R$^{1b}$ = R$^{1c}$ = R$^{1d}$ = cumyl, R$^2$ = Bn.

[n] Compound 4, where R$^{1a}$ = R$^{1d}$ = Cl, R$^{1b}$ = R$^{1c}$ = $^t$Bu, R$^2$ = Bn Given the high activity and iso-selectivity observed for the 1-La/TPPO/$^i$PrOH catalyst system, further investigation into the polymerization mechanism was made. The catalyst system displayed characteristics of a living polymerization, as evidenced by the linear increase in molecular weight with substrate equiv and narrow Đ. Addition of alcohols as chain-transfer agents can facilitate "immortal" polymerization conditions and offers further control of the target polymer's final MW. Addition of varying equivalents of chain-transfer agent (e.g. $^i$PrOH) to the 1-La/TPPO catalyst system maintained high levels of activity, iso-selectivity, and molecular weight control, where experimental $M_n$ agreed well with those predicted by theory (Table 1, entries 8, 14, and 15). Diols can also be used, with hexamethylene diol as a representative example (Table 1, entry 16). End-group analysis clearly revealed initiation by the metal-isopropoxide species, as supported by the presence of the isopropyl ester group in the $^1$H-NMR (FIG. 7), and MALDI spectra (FIG. 9) from isolated polymer samples. Elimination of the secondary alcohol to generate a crotonate end-group is also observed by NMR and MALDI, along with a small amount of cyclized P3HB.

We also explored the impact of temperature and catalyst loading with the most selective phosphine oxide combinations, TPPO and TOPO. Lowering the temperature from RT to 0 and 30° C. (Table 1, entries 17-22) increased isotactic content in P3HB, where a $P_m$ of 0.80 and 0.81 could be reached in 6 h at 30° C. with 1La/$^i$PrOH/2 L (L=TPPO or TOPO respectively). Notably, this represents the highest iso-selectivity for the ROP of rac-BBL to date by a homogeneous catalyst, and is only outperformed by Thomas's silica-supported single-site Nd-borohydride heterogeneous catalyst. [rac-BBL]:[Cat] ratios could be increased to 400 while maintaining reasonable rates and selectivities (Table 1, entries 18 and 21).

TABLE 2

Comparison of RE complexes with and without a tethered donor in ROP of rac-BBL.[a]

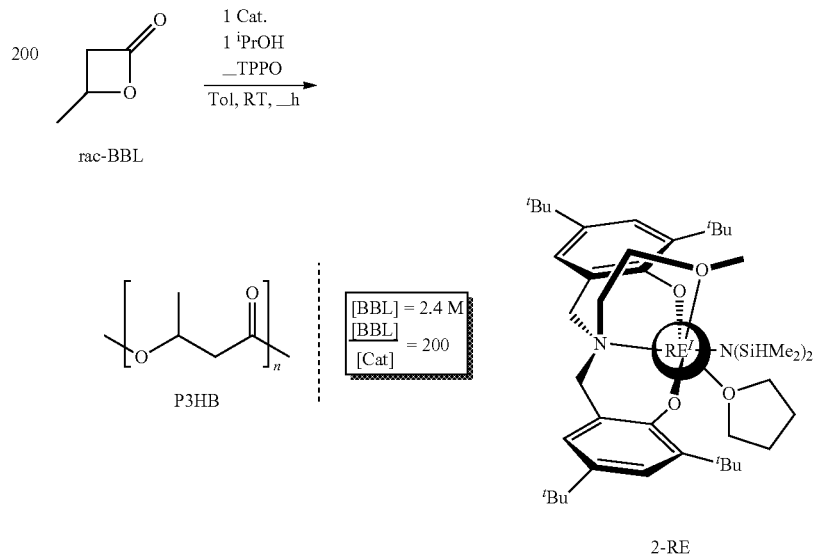

| Entry | [Cat] | [TPPO]:[RE] | Time (h) | Conv. (%)[a] | $M_{n, exp.}$[b] (kg/mol) | Đ[b] | $P_m$[c] |
|---|---|---|---|---|---|---|---|
| 1 | 1-La | 0 | 48 | 42 | 2.2 | 1.26 | 0.57 |
| 2 | 1-La | 2 | 3 | 92 | 11.6 | 1.05 | 0.71 |
| 3 | 2-La | 0 | 24 | 22 | 1.4 | 1.17 | 0.45 |
| 4 | 2-La | 1 | 24 | 21 | 1.6 | 1.14 | 0.49 |
| 5 | 2-La | 2 | 24 | 21 | 1.7 | 1.16 | 0.48 |
| 6 | 1-$Y_2$ | 0 | 24 | 33 | 5.9 | 1.15 | 0.55 |
| 7 | 1-$Y_2$ | 2 | 3 | 95 | 14.0 | 1.18 | 0.51 |
| 8 | 2-Y | 0 | 1 | 91 | 14.2 | 1.16 | 0.22 |
| 9 | 2-Y | 1 | 1 | 99 | 17.6 | 1.12 | 0.22 |
| 10 | 2-Y | 2 | 1 | 99 | 15.9 | 1.14 | 0.22 |

[a]Determined by $^1$H-NMR from integration of BBL and PHB methine resonances. Reaction times not optimized.
[b][BBL]/[Cat]/[$^i$PrOH] × Conv. × 0.08609 kg•mol$^{-1}$.
[c]Determined by gel permeation chromatography (GPC) at 30° C. in THF using polystyrene standards and corrected by Mark-Houwink factor of 0.54.
[d]$M_w/M_n$.
[e]Probability of meso-linkages between repeat units. Determined by integration of P3HB C=O resonances using inverse gated (IG) $^{13}$C-NMR.

Given the dramatic impact of added neutral ligands on the ROP of rac-BBL by RE$^{III}$ amino-diphenolate catalysts without a tethered donor (e.g. 1-La), we were curious how this might affect smaller RE$^{III}$ centers and tethered donor systems (e.g. 1-$Y_2$, 2-Y, and 2-La). Carpentier and Rieger have independently reported size-dependent catalyst reactivity and stereoselectivity with tethered donor complexes, 2-RE. Both rates and syndio-selectivity increased as ionic radii decreased, which was attributed to increased steric discrimination with the smaller metal ions. In contrast, we observed an opposite trend for 1-RE/2 TPPO, where reactivity and iso-selectivity increased with ion size (as evidenced by conversion and $P_m$ values in Table 2). Addition of 2 equiv TPPO and 1 equiv $^i$PrOH per Y in 1-$Y_2$ significantly improved reactivity (as evidenced by conversion values in Table 2, entry 3 and 4; 4 h: 99% vs 9% conversion), but lost any degree of stereoselection ($P_m$~0.5, atactic). Unlike 1-RE, addition of TPPO (1 or 2 equiv) to 2-Y and 2-La had a minor impact on reactivity and selectivity (Table 2, entries 4, 5, 9, and 10), despite evidence for TPPO binding in solution.

Figure 14:
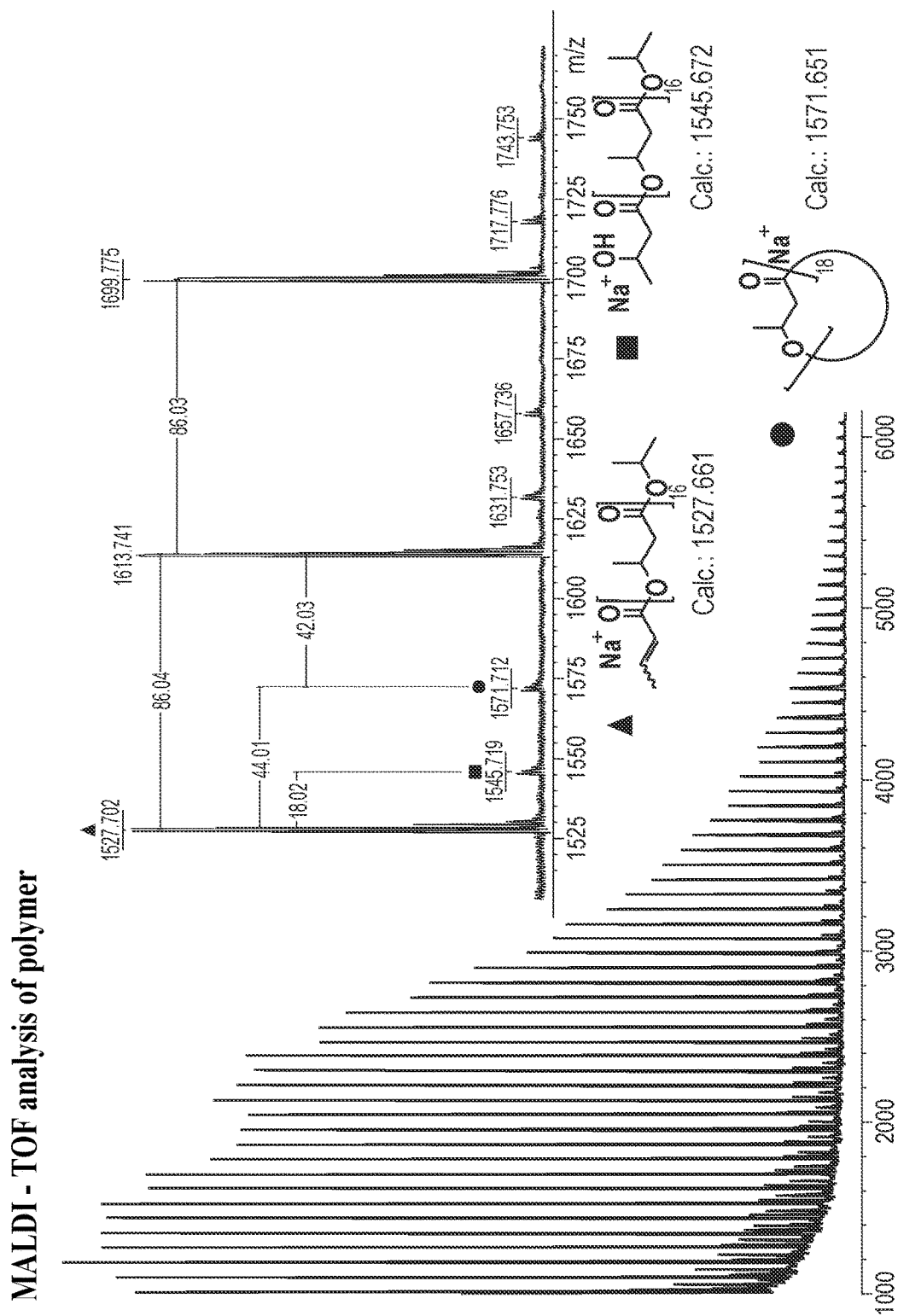

FIG. 14 shows the MALDI-TOF spectrum of P3HB, produced in toluene at ambient temperature with [BBL]/[1-La]/[OPPh$_3$]/[i-PrOH]=40/1/2/1 and [BBL]=2.4 M within 1 h. Conversion=99%, $M_n$=3.8 kg/mol (corrected by Mark-Houwink factor of 0.54), Đ=1.15.

FIG. 14 confirms that entry 2 in Table 2 was an isotactic enriched sample, entry 7 was an atactic enriched sample, and entry 8 was a syndiotactic enriched sample.

In summary, we have synthesized and evaluated the reactivity of novel benzyl-substituted amino-diphenolate rare-earth complexes, 1-RE compounds of Formula I, as catalysts in the stereospecific ROP of rac-BBL. We have found that upon removal of the tethered donor, catalyst reactivity and polymer tacticity were dramatically enhanced (as evidenced by conversion and $P_m$) by adding hard neutral ligands such as TPPO to 1-La. 1-La/2 TOPO displays high activity and is the most iso-selective (higher $P_m$ values) homogeneous catalyst for ROP of rac-BBL reported to date ($P_m$=0.81 at 30° C., 0.75 at RT). Our preliminary mechanistic studies indicate that ROP of rac-BBL by 1-La(TPPO)$_2$ proceeds with living-characteristics, polymer stereo control occurs through a chain-end control mechanism, and dissociation of TPPO readily occurs during catalysis. Notably, the closely-related systems which include tethered donors, such as 2-Y, display opposite stereochemical preference (ie highly syndio-selective as evidenced by $P_m$ values), which cannot be overridden by simply adding phosphine oxide.

The invention claimed is:
1. A process for stereospecific synthesis of aliphatic esters of Formula X:

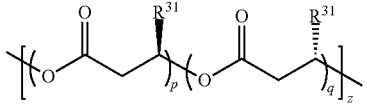

wherein:
$R^{31}$ is selected from $C_{1-4}$ alkyl, $C_{3-8}$ saturated or unsaturated alkyl, $C_{3-8}$ branched or cyclo alkyl, $(CH_2)_{0-3}$ aryl, allyl, and —COO—$R^{32}$;
$R^{32}$ is selected from $C_1$-$C_4$ straight chain alkyl, $C_{3-8}$ branched alkyl, $C_{3-8}$ cyclo alkyl, $C_{6-10}$ aryl, $C_{4-10}$ heteroaryl, and Si—$(C_1$-$C_4$ straight chain alkyl$)_3$;
"p" and "q" independently represent a number from 1 to 100; and
"z" represents a number from 2 to about 200;
said process comprising:
(a) contacting a compound of Formula II

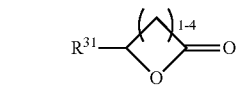

with an alcohol, an optional ligand, and a compound of Formula I

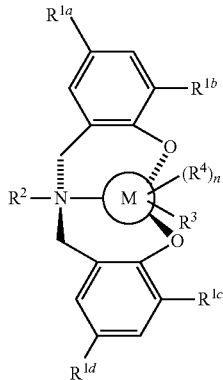

Formula I wherein:
$R^{1a}$, $R^{1b}$, $R^{1c}$, and $R^{1d}$ independently at each occurrence are selected from H, $C_1$-$C_4$ straight chain alkyl, $C_{3-10}$ branched alkyl, $C_{3-10}$ cyclo alkyl, $C_1$-$C_4$ straight chain alkyl substituted with up to four aryl groups, $C_{3-10}$ branched alkyl substituted with up to 4 aryl groups, $C_{3-10}$ cyclo alkyl substituted with up to 4 aryl groups, alkoxy aryl, thio-alkoxy, thio-alkoxy aryl, $C_{6-10}$ aryl, $C_{4-10}$ heteroaryl, halide, alkoxy, C(O)O$C_{1-4}$ alkyl, $N(R^{14})_2$, aryl-oxy, and halo-alkyl;
$R^2$ is selected from H, branched alkyl, alkyl, alkyl-aryl, silyl-$(R^{31})_3$, alkyl-silyl$(R^{31})_3$, and optionally substituted aryl;
$R^3$ is selected from $C(R^{13})_3$, $N(R^{13})_2$, $OR^{13}$, and $SR^{13}$;
$R^4$ independently at each occurrence is selected from

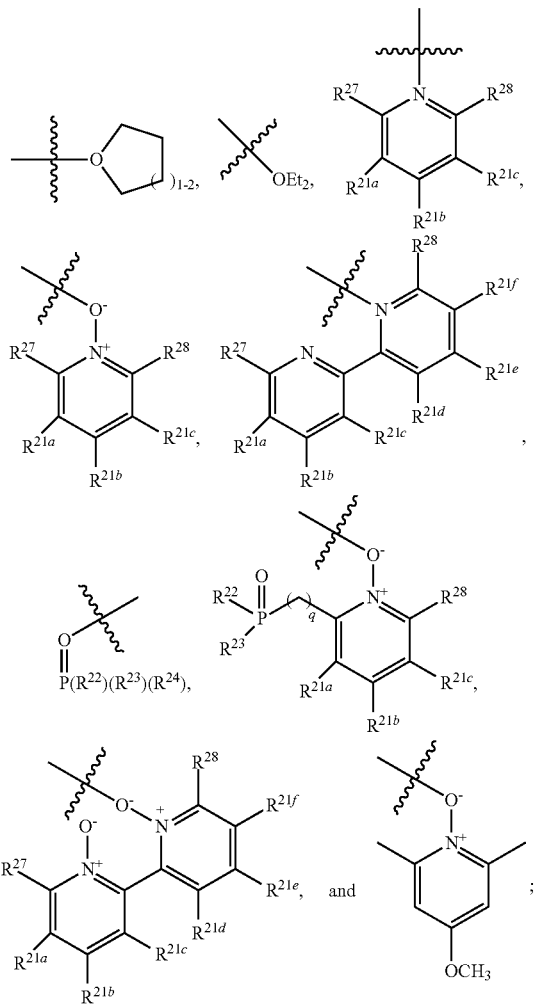

M is selected from rare earth group of elements and group 13 elements;
"n" represents an integer from 1 to 4;
"q" represents an integer from 0 to 6;
$R^{13}$ independently at each occurrence is selected from OCH(aryl)$_2$, $C_1$-$C_4$ straight chain alkyl, $C_{3-8}$ branched alkyl, $C_{3-8}$ cyclo alkyl, alkoxy aryl, thio-alkoxy, thio-alkoxy aryl, $C_{6-10}$ aryl, $C_{4-10}$ heteroaryl, halide, alkoxy, primary amine, tertiary amine, aryl-oxy, Si—$(C_1$-$C_4$ straight chain alkyl$)_3$, SiH—$(C_1$-$C_4$ straight chain alkyl$)_2$, and halo-alkyl;
$R^{14}$ independently at each occurrence is selected from $C_1$-$C_4$ straight chain alkyl, $C_{3-8}$ branched alkyl, $C_{3-8}$ cyclo alkyl, $C_{6-10}$ aryl, $C_{4-10}$ heteroaryl, C(O)—$C_1$-$C_4$ straight chain alkyl, C(O)—$C_{3-8}$ branched alkyl, C(O)—$C_{3-8}$ cyclo alkyl, C(O)—$C_{6-10}$ aryl, C(O)—$C_{4-10}$ heteroaryl Si—$(C_1$-$C_4$ straight chain alkyl$)_3$, SiH—$(C_1$-$C_4$ straight chain alkyl$)_2$, and halo-alkyl;
$R^{21a}$, $R^{21b}$, $R^{21c}$, $R^{21d}$, $R^{21e}$, and $R^{21f}$ independently at each occurrence are selected from NO$_2$, CN, CHO, COOH, CONH$_2$, Cr—$C_4$ straight chain alkyl, $C_{3-8}$ branched alkyl, $C_{3-8}$ cyclo alkyl, $C_{6-10}$ aryl, $C_{4-10}$ heteroaryl, C(O)—$C_1$-$C_4$ straight chain alkyl, C(O)—$C_{3-8}$ branched alkyl, C(O)$C_{3-8}$ cyclo alkyl, C(O)—$C_{6-10}$ aryl, C(O)—$C_{4-10}$ heteroaryl Si—$(C_1$-$C_4$ straight chain alkyl$)_3$, SiH—$(C_1$-$C_4$ straight chain alkyl$)_2$, H, N$(R^{26})_2$, OR$^2$S, and halo-alkyl;

$R^{22}$, $R^{23}$, and $R^{24}$ independently at each occurrence are selected from substituted and unsubstituted amines, from $C_1$-$C_4$ straight chain alkyl, $C_{3-8}$ branched alkyl, aryl, heteroaryl, $C_{3-8}$ cyclo alkyl, $CR^{13}$, $(CH_2)_{1-6}P(O)(R^{25})_3$, and $N(R^{13})_2$;

$R^{25}$ represents alkyl or aryl;

$R^{26}$ represents alkyl; and $R^{27}$ and $R^{28}$ independently at each occurrence is selected from O—$R^{26}$, halogen, H and $C1C_4$-alkyl; to form a mixture, and (b) agitating said mixture at a temperature ranging from about −50° C. to about +50° C. from about 5 mins to about 48 hours to yield a compound of Formula X.

2. The process of claim 1 wherein:

"n" represents an integer from 2 to 3;

"q" represents an integer from 1-3;

$R^{1a}$, $R^{1b}$, $R^{1c}$, and $R^{1d}$ independently at each occurrence are selected from H, methyl, t-butyl, cumyl, and triphenylmethyl;

$R^2$ is selected from benzyl, $CH(CH_3)_2$, $CH_2$-hexyl, methyl, H, and t-butyl;

$R^3$ is selected from $N(R^{13})_2$, $C(R^{13})_3$, and $OR^{13}$;

$R^4$ is selected from

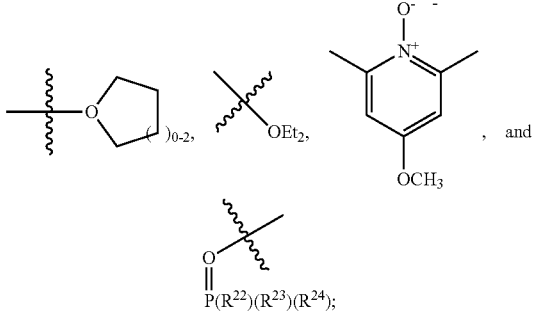

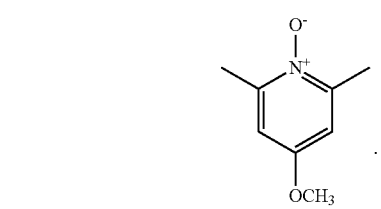

$R^{13}$ independently at each occurrence is selected from $CH_2$-$Ph_2$, $C_1$-$C_4$ straight chain alkyl, $C_{3-6}$ branched alkyl, $C_{3-6}$ cyclo alkyl, $C_{6-8}$ aryl, $C_{5-9}$ heteroaryl, alkylaryl, tertiary amine, aryl-oxy, Si—$(C_1$-$C_4$ straight chain alkyl$)_3$, and SiH—$(C_1$-$C_4$ straight chain alkyl$)_2$;

$R^{22}$, $R^{23}$, and $R^{24}$ independently at each occurrence are selected from substituted and unsubstituted amines, $C_1$-$C_4$ straight chain alkyl, $C_{3-8}$ cyclo alkyl, aryl, heteroaryl, $(CH_2)_{1-6}P(O)(R^{25})_3$, $(CH_2)_{1-6}O(R^{25})$, $(CH_2)_{1-6}N(R^{25})_2$, and $N(R^{13})_2$;

$R^{25}$ represents alkyl or aryl;

$R^{26}$ represents $C_{1-4}$-alkyl; and $R^{27}$ and $R^{28}$ independently at each occurrence is selected from H and $C_1C_4$-alkyl; to form a mixture; and (b) agitating said mixture at a temperature ranging from about −50° C. to about +50° C. from about 10 mins to about 48 hours to yield a compound of Formula X.

3. The process of claim 2 wherein:

$R^3$ represents $C(R^{13})_3$, $OR^{13}$, or $N(R^{13})_2$.

4. The process of claim 2 wherein:

$R^{1a}$, $R^{1b}$, $R^{1c}$, and $R^{1d}$ independently at each occurrence represent t-butyl or cumyl.

5. The process of claim 2 wherein:

$R^3$ represents O—$CH(Ph)_2$, O-i-propyl, or $N(SiHMe_2)_2$.

6. The process of claim 2 wherein $R^2$ is H, methyl, i-propyl, or benzyl.

7. The process of claim 2 wherein M represents a rare earth element selected from cerium (Ce), dysprosium (Dy), erbium (Er), europium (Eu), gadolinium (Gd), holmium (Ho), lanthanum (La), lutetium (Lu), neodymium (Nd), praseodymium (Pr), samarium (Sm), terbium (Tb), thulium (Tm), ytterbium (Yb), yttrium (Y), and the group 13 elements are selected from B and Al.

8. The process of claim 2 wherein $R^4$ is selected from $P(O)(NCH_3)_2)_3$, $P(O)(Ph)_3$, $P(O)(C_8H_{13})$, and 9. The process of claim 2 wherein:

A the mixture is agitated at a temperature ranging from about −30° C. to about +30° C. from about 30 minutes to about 24 hours.

10. The process of claim 2 wherein the alcohol is an aliphatic alcohol selected from methanol, benzyl alcohol, phenethyl alcohol, ethanol, polyol, and i-propanol.

* * * * *